United States Patent
Mercer

(10) Patent No.: US 9,383,761 B2
(45) Date of Patent: Jul. 5, 2016

(54) APPARATUS AND METHOD FOR MULTIPHASE SMPS INTERLEAVING

(71) Applicant: Texas Instruments Incorporated, Dallas, TX (US)

(72) Inventor: Steven Mark Mercer, Livermore, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 207 days.

(21) Appl. No.: 14/323,870

(22) Filed: Jul. 3, 2014

(65) Prior Publication Data

US 2016/0004266 A1 Jan. 7, 2016
US 2016/0124446 A9 May 5, 2016

Related U.S. Application Data

(60) Provisional application No. 61/844,964, filed on Jul. 11, 2013.

(51) Int. Cl.
G05F 1/575 (2006.01)
H02M 3/158 (2006.01)

(52) U.S. Cl.
CPC ............ *G05F 1/575* (2013.01); *H02M 3/1584* (2013.01); *H02M 2003/1586* (2013.01)

(58) Field of Classification Search
CPC .................. H02M 3/1584; H02M 2003/1586; H02M 3/156; H03L 7/087; H03L 7/081; H03L 7/23; G05F 1/575; G05F 1/10; G05F 1/577; G05F 1/12
See application file for complete search history.

(56) References Cited

U.S. PATENT DOCUMENTS

| | | | | |
|---|---|---|---|---|
| 7,548,047 B1* | 6/2009 | Dasgupta | ............... | H02M 3/156 323/283 |
| 2004/0183511 A1* | 9/2004 | Dening | ................. | H02M 3/156 323/282 |
| 2007/0253223 A1* | 11/2007 | Neidorff | ............. | H02M 1/4216 363/2 |
| 2009/0237049 A1* | 9/2009 | Hachiya | ................ | H02M 3/156 323/282 |
| 2012/0286750 A1* | 11/2012 | Xu | ........................ | H02M 3/156 323/282 |

* cited by examiner

*Primary Examiner* — Asolf Berhane
*Assistant Examiner* — Henry Lee, III
(74) *Attorney, Agent, or Firm* — Michael A. Davis, Jr.; Frank D. Cimino

(57) ABSTRACT

In described examples, a phase interleaver obtains (i) a first signal indicating a variance between a reference voltage and a regulated output voltage and (ii) a second signal indicating a voltage across an energy storage device. A voltage regulator includes multiple phase blocks collectively configured to generate the regulated output voltage. In a repeating cycle, (i) the voltage across the energy storage device is increased while the second signal is less than the first signal and (ii) in response to a determination that the second signal is greater than the first signal, the energy storage device is substantially discharged, multiple stages of a clock divider are transitioned in the phase interleaver, and a set of control signals is output from the clock divider. The control signals have a common switching frequency and a common switching period. The control signals control the phase blocks active in generating the output voltage.

19 Claims, 14 Drawing Sheets

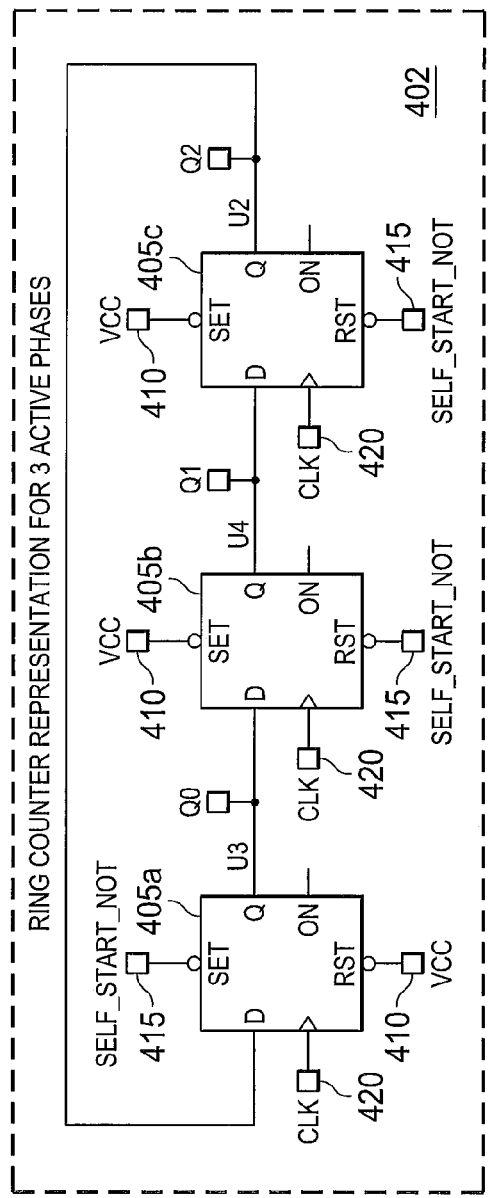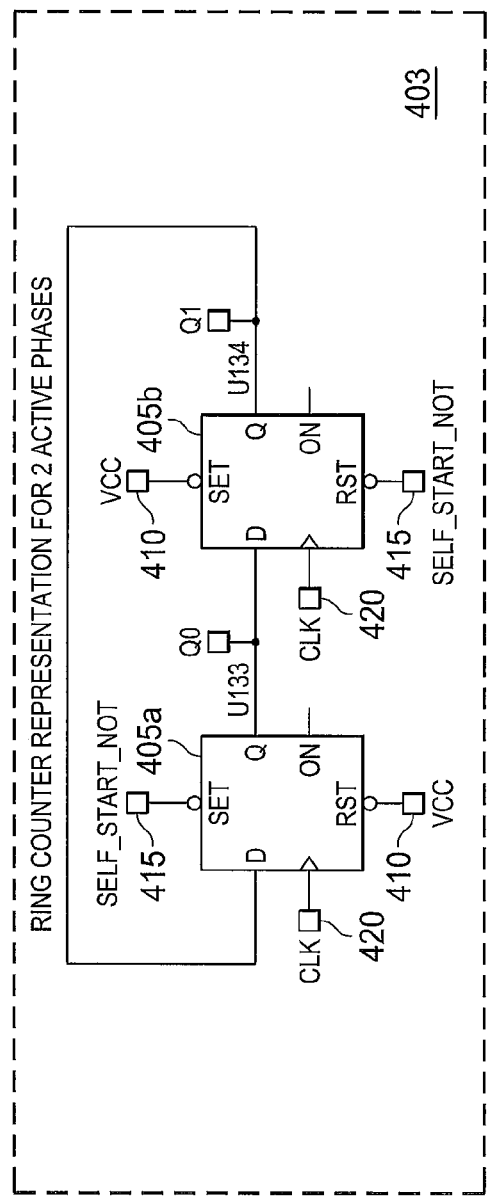
FIG. 4C
FIG. 4D

APPARATUS AND METHOD FOR MULTIPHASE SMPS INTERLEAVING

CROSS-REFERENCE TO RELATED APPLICATION

This application claims priority to U.S. Provisional Patent Application Ser. No. 61/844,964, filed Jul. 11, 2013, which is hereby fully incorporated herein by reference for all purposes.

TECHNICAL FIELD

This disclosure relates in general to electrical power supplies, and in particular to apparatus and method for multiphase switch-mode power supply (SMPS) interleaving.

BACKGROUND

The number of transistors in digital integrated circuits including but not limited to central processing units (CPUs), graphics processing units (GPUs), memory (for example, double data rate (DDR) and similar) and application-specific integrated circuits (ASICs) generally increases from one generation to the next, driven by market demand for faster and smaller processing capability. This trend has an impact on the point of load (POL) direct current to direct current (DC/DC) converters that convert a system DC voltage to an integrated circuit "core" voltage. Specifically, incremental density improvements in digital integrated circuits tend to cause incremental reductions in typical core voltage ranges and corresponding increases in core load currents. Many commonly used DC/DC topologies used in POL applications use some form of a switched-inductor switch mode power supply (SMPS), with one example being a synchronous buck DC/DC converter. In this example, the synchronous buck DC/DC converter output voltage is set by controlling its duty cycle for a given input voltage. Ideally, if, for example, an output voltage of 1.2V is required, and an input of 12V is provided, then an ideal buck regulator ON-time divided by the switching period ($T_{ON}/T$) would nominally be equal a duty cycle (D) of about 10%. The input voltage multiplied by the duty cycle would nominally yield the output voltage desired. In closed loop operation with lossy components employed, the actual duty cycle will be greater than the nominal duty cycle described.

It is often advantageous to interleave multiple switched inductor 'phases' each designed to support a fraction of the full processor current as opposed to having one 'large' phase designed for supporting all the processor current. The benefits of interleaving multiple phases are well established. A partial list of the system benefits of switched-inductor multiphase interleaving are efficiency improvements when employing phase adding/dropping proportional to the load current, reduction in voltage ripple at the DC/DC converter output, and the opportunity for improved transient response.

Multiphase interleaving requires circuitry to position switched inductor ON-times evenly over time if operating in a steady-state condition. For example, in a two-phase synchronous buck converter running in steady-state conditions with a switching frequency of 1 MHz (therefore a switching period 'T' of 1.0 μs per phase), it is desirable to delay the turn-ON of phase 2 relative to phase 1 turn-ON by 'T' divided by two, or 500 nanoseconds (ns). When expressing this phase relationship in terms of phase angle, phase 2 would be 180 degrees out of phase with respect to phase 1 for typical 2-phase sync-buck interleaving in steady state operation. To generalize the desired multiphase interleaving behavior in terms of phase angle in units of degrees, for 'N' number of active phases, the phase angle (expressed in degrees) from one active phase to the next active phase becomes (360°)/N. There are a number of proven multiphase interleaving algorithms implemented in existing DC/DC 'controllers' that yield multiphase interleaving. Some approaches require a fixed switching frequency, yielding a form of classical multiphase pulse-width modulation (PWM). Some other approaches that yield multiphase interleaving support the interleaving of constant ON-times, with OFF times allowed to vary, resulting in switching frequencies that are not held constant. There are many existing approaches taken to synthesize multiphase interleaving, each with tradeoffs in the ability to modulate duty-cycle when encountering a load, line, or setpoint transient, tradeoffs in the maximum number of interleaved phases supported, tradeoffs in the time necessary to refresh the phase delay from one active phase to the next active phase as phases are dynamically added and dropped, and tradeoffs in cost as expressed by silicon area required and power consumed corresponding to the multiphase interleaving collateral operating within an 'controller' integrated circuit.

SUMMARY

In a first example, a method includes obtaining at a phase interleaver (i) a first signal indicating a variance between a reference voltage and a regulated output voltage and (ii) a second signal indicating a voltage across an energy storage device. A voltage regulator includes multiple phase blocks collectively configured to generate the regulated output voltage. The method also includes, in a repeating cycle, (i) increasing the voltage across the energy storage device while the second signal is less than the first signal and (ii) in response to a determination that the second signal is greater than the first signal, substantially discharging the energy storage device, transitioning multiple stages of a clock divider in the phase interleaver, and outputting a set of control signals from the clock divider. The set of control signals has a common switching frequency and a common switching period, and the set of control signals controls the phase blocks in the voltage regulator that are active in generating the regulated output voltage.

In a second example, an apparatus includes a comparator configured to compare (i) a first signal indicating a variance between a reference voltage and a regulated output voltage that is generated by a voltage regulator including multiple phase blocks and (ii) a second signal indicating a voltage across an energy storage device. The apparatus also includes a phase interleaver configured in a repeating cycle to (i) increase the voltage across the energy storage device while the second signal is less than the first signal and (ii) in response to a determination that the second signal is greater than the first signal, substantially discharge the energy storage device, transition multiple stages of a clock divider in the phase interleaver, and output a set of control signals from the clock divider in order to control the phase blocks in the voltage regulator that are active in generating the regulated output voltage. The set of control signals has a common switching frequency and a common switching period.

In a third example, a system includes a voltage regulator having multiple phase blocks collectively configured to generate a regulated output voltage. The system also includes a comparator configured to compare (i) a first signal indicating a variance between a reference voltage and the regulated output voltage and (ii) a second signal indicating a voltage across an energy storage device. The system further includes a phase interleaver configured in a repeating cycle to (i) increase the voltage across the energy storage device while the second signal is less than the first signal and (ii) in response to a determination that the second signal is greater than the first signal, substantially discharge the energy storage device, transition multiple stages of a clock divider in the phase interleaver, and output a set of control signals from the clock divider in order to control the phase blocks in the voltage regulator that are active in generating the regulated output voltage. The set of control signals has a common switching frequency and a common switching period.

BRIEF DESCRIPTION OF THE DRAWINGS

FIGS. 4A-4D are schematics of examples of a dynamic clock divider.

DETAILED DESCRIPTION

Figure 1:
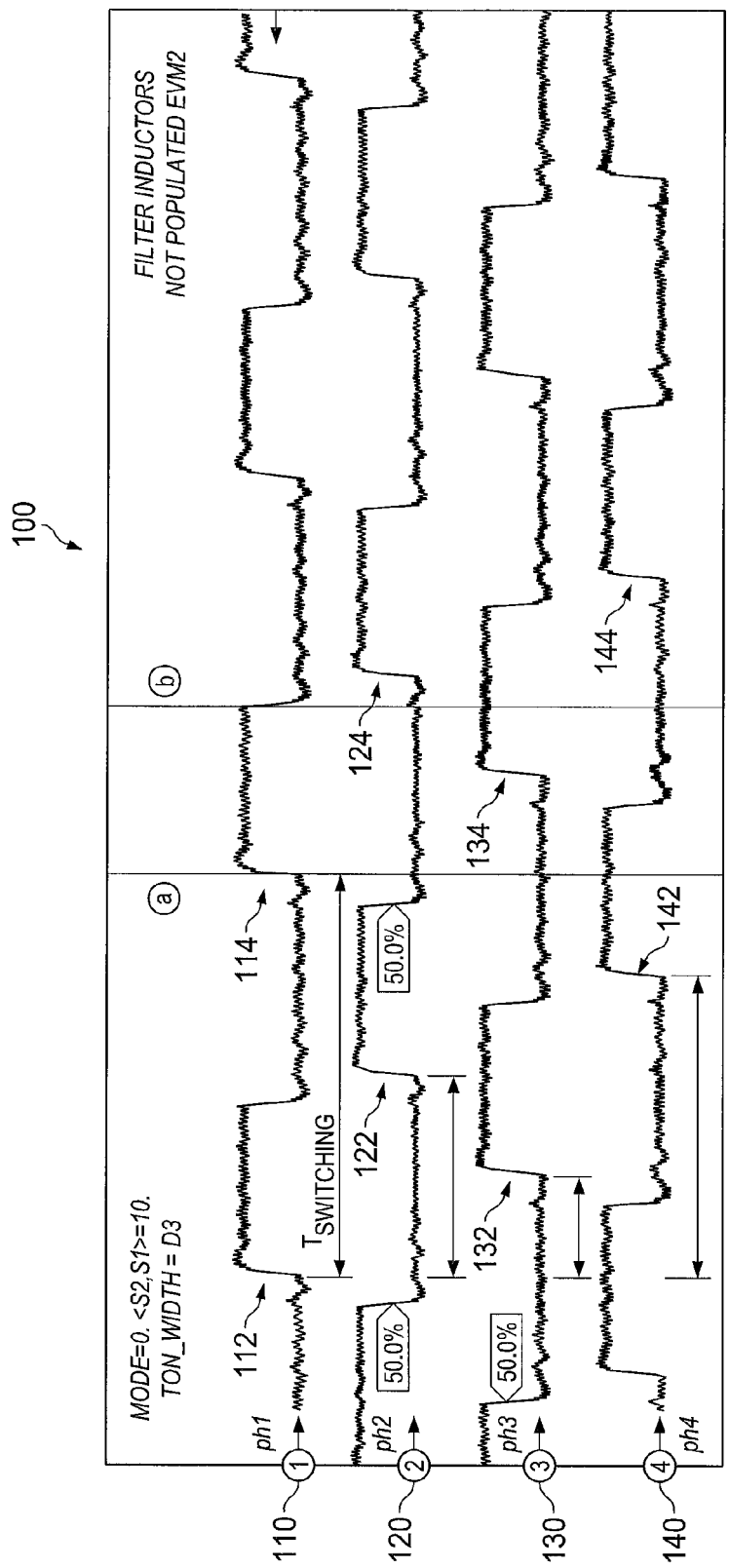
FIG. 1 is an example timing diagram for multiphase switch-mode power supply (SMPS) interleaving using clock division.

Computing devices often use switch-mode power supplies (SMPSs) that include multiphase synchronous buck (sync-buck) DC/DC converters. In one example, a multiphase sync-buck DC/DC converter is a non-isolated converter that receives a switching control signal to interleave phases for its switch nodes. The multiphase sync-buck DC/DC converter includes two or more switched inductor phases, with each phase consisting of a high side (control) switch, low side (synchronous) switch, and a filter inductor with each phase connected to a common output node. In this example, all of the synchronous buck phases are connected to a common output node operate using a common switching frequency, although the delay in ON-times amongst adjacent active phases are controlled in accordance with the disclosed interleaving method.

Interleaving can be performed in a variety of ways. For example, interleaving can be performed using a phase locked loop (PLL) or a delay locked loop (DLL). PLLs and DLLs may be designed for interleaving at a 300 kHz to 6 MHz switching frequency range per phase without adding significant cost in terms of silicon area used. However, according to this disclosure, a very high switching frequency per phase is desired. For example, 20 MHz is a high switching frequency per phase compared a range between 300 kHz and 6 MHz.

In order to achieve switching at a high frequency (such as 20 MHz relative to 300 kHz), PLLs and DLLs that are designed for interleaving at 300 kHz are scaled into high performance blocks. High performance blocks of PLLs or DLLs can be used, albeit inefficiently and unwieldy, to support 20 MHz switching, but the resulting circuitry often has energy compliance violations and power dissipation problems. In scaling the PLLs and DLLs, a lot of power is consumed to bias the analog circuitry (PLLs and DLLs), and a lot of silicon area is used. In this scaled-up example, if the power budget is entirely consumed by a controller of the regulator, then no power loss budget remains to be allocated for losses associated with other required blocks within the regulator including filter inductors, power MOSFETS, and other components of the power converter circuit.

Embodiments of this disclosure interleave without using a PLL and without using a DLL. Various embodiments of this disclosure use asynchronous clock division to interleave multiple phases for a SMPS. Compared with interleaving methods that use PLL circuit elements or DLL circuit elements, embodiments of this disclosure use less power and use less silicon area to interleave. Various embodiments of this disclosure also interleave for a low period high frequency power supply. The embodiments of this disclosure reduce the power consumption associated with controlling the regulator.

The interleaving techniques and systems of this disclosure are useful in various applications, such as in power converters and power supplies. For example, the systems and methods of interleaving according to this disclosure can be used as a part of a method of controlling a regulator of a power supply.

FIG. 1 is an example timing diagram 100 for multiphase SMPS interleaving using clock division.

A multiphase SMPS includes a DC/DC converter having multiple switch nodes, where each switch node outputs a switch node signal. The number of switch nodes can be any number greater than one. An output terminal of the multiphase SMPS supplies an output voltage ($V_{OUT}$) and an output current to a load that is coupled to the output terminal. The regulator duty cycle is expressed as the ratio of ON time to the total period for a given phase, and the output voltage is nominally the product of the regulator input voltage and the duty cycle. The output current of the regulator that is delivered to the load is the sum of all of the DC currents from each active switched inductor phase. The interleaved current ripple corresponding to each active switched inductor current connected to a common output node causes ripple voltage at the output, determined (in part) by the interleaved ripple current amplitude, the output capacitor effective series resistance (ESR), the output capacitor effective series inductance (ESL), and the capacitance value corresponding to the output decoupling network. The voltage of each switch node signal depends on the mode (an ON mode or an OFF mode) of the corresponding switch, and the ON mode voltage level is different from the OFF mode voltage level. For example, the ON mode voltage level can be a supply voltage VCC, and the OFF mode voltage level can be ground potential.

An interleaving process executed on the switch nodes causes each switch node to turn ON at a different time than the other switch nodes. Each switch node periodically cycles ON and OFF during a switching period, and the turn-ON-time for each respective switch node is time-shifted from the time at which the first switch node turns ON. A series of time-shifts can be expressed as integer multiples of the switching period/N, where N is the number of active switch nodes. Accordingly, each switch node corresponds to one of multiple phases in a one-to-one relationship. Each phase is phase-shifted from its preceding phase and its succeeding phase by an amount according to the expression 360°/N. Each phase block receives a switching control signal with a phase difference according to the expression 360°/N. In the case of N=2 phases, the phase control signals are shifted from each other by 180°. In the case of N=4 phases, the phase control signals are shifted from each other by 90°.

In the following discussion, a particular example is described in which a four-phase SMPS executes an interleaving method using asynchronous clock division. However, other implementations of the SMPS could also be used.

Four waveforms 110-140 shown in FIG. 1 represent voltage levels that are output from a sync-buck DC/DC converter having four switch nodes. The horizontal axis represents time, and the vertical axis represents voltage level. Each waveform 110-140 represents voltage levels output from a corresponding one of the four switching nodes of the converter.

According to this disclosure, "interleaved" means that rising/falling edges of waveforms are time-shifted with respect to one another. A rising-edge of a signal occurs when the amplitude of the signal rises from a low value to a high value (such as a voltage that rises from ground potential corresponding to a "0" value to a supply voltage VCC corresponding to a one "1" value). The sync-buck DC/DC converter in this example has interleaved phases according to a continuously repeating firing sequence [Phase 1, Phase 3, Phase 2, Phase 4, Phase 1, Phase 3, Phase 2, Phase 4, etc.]. In FIG. 1, the four phrases are denoted "ph1" through "ph4." The waveform 110 is anti-phase from the waveform 120, meaning the waveform 110 is phase shifted by 180° from the waveform 120. Similarly, the waveform 130 is anti-phase (phase shifted by 180°) from the waveform 140. The waveform 130 is phase shifted by 90° with respect to the waveform 110, and the waveform 140 is phase shifted by 90° with respect to the waveform 120.

The waveforms 110-140 share the same switching period (T, shown as $T_{SWITCHING}$). The switching period is the amount of time between two consecutive rising edges 112-114 of the waveform 110, between two consecutive rising edges 122-124 of the waveform 120, between two consecutive rising edges 132-134 of the waveform 130, and between two consecutive rising edges 142-144 of the waveform 140. The switch nodes corresponding to phases 1-4 generate a repeatable phase angle such that the phase angle of the waveform 110 is repeatable by the other waveforms 120-140. The phase angle is related to the number N of active phases by the expression 360°/N.

The amount of time between the first rising edge 112 of the waveform 110 and the first rising 122 edge of the waveform 120 is half of the switching period (T/2). The amount of time between the first rising edge 112 of the waveform 110 and the first rising 132 edge of the waveform 130 is a quarter of the switching period (T/4). The amount of time between the first rising edge 112 of the waveform 110 and the first rising 142 edge of the waveform 140 is three-quarters of the switching period (3T/4).

Figure 2:
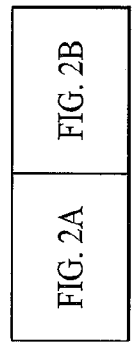
FIGS. 2A and 2B (collectively "FIG. 2") are block diagrams of an example multiphase SMPS having an interleaver using clock division.
Figure 2A:
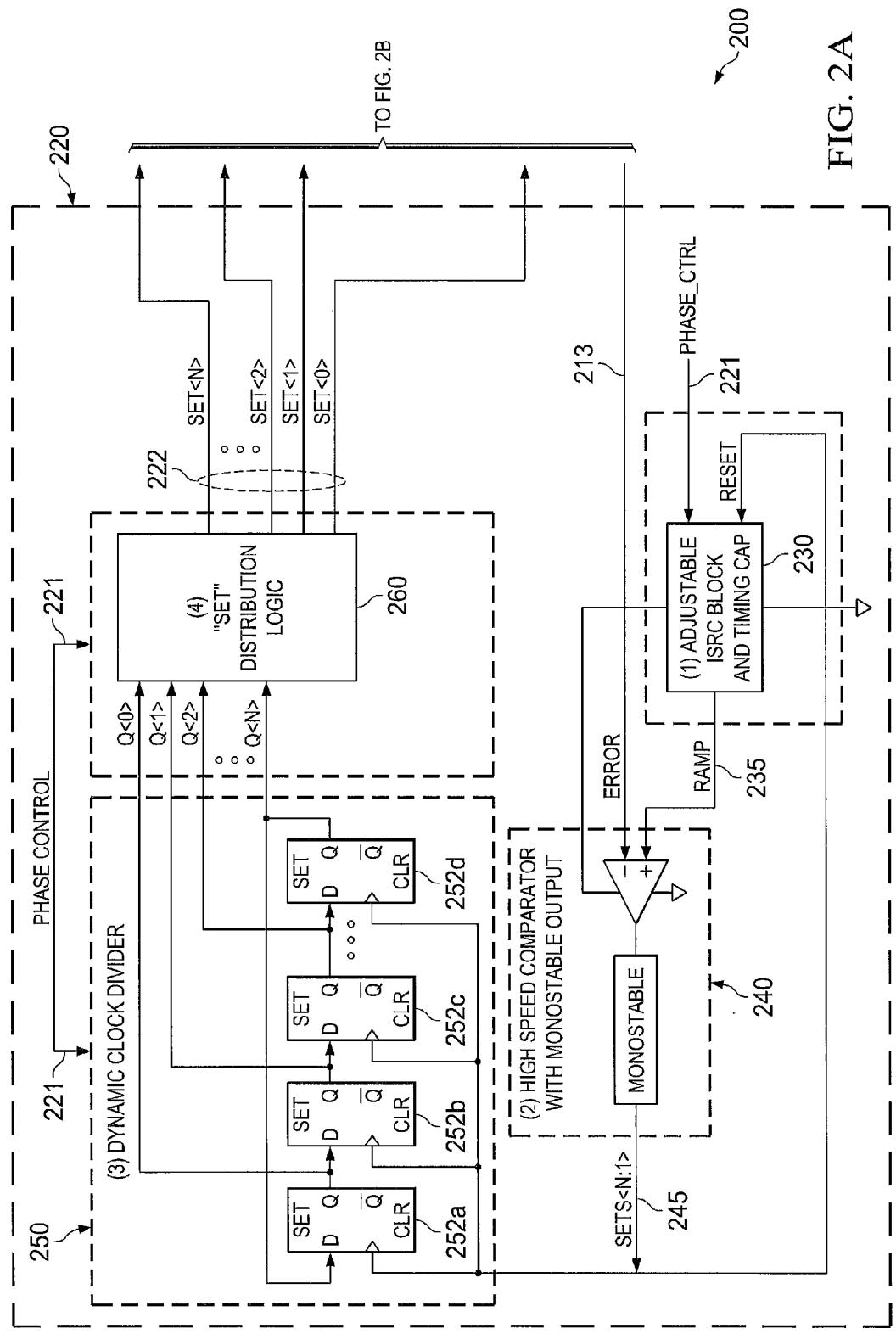
Figure 2B:
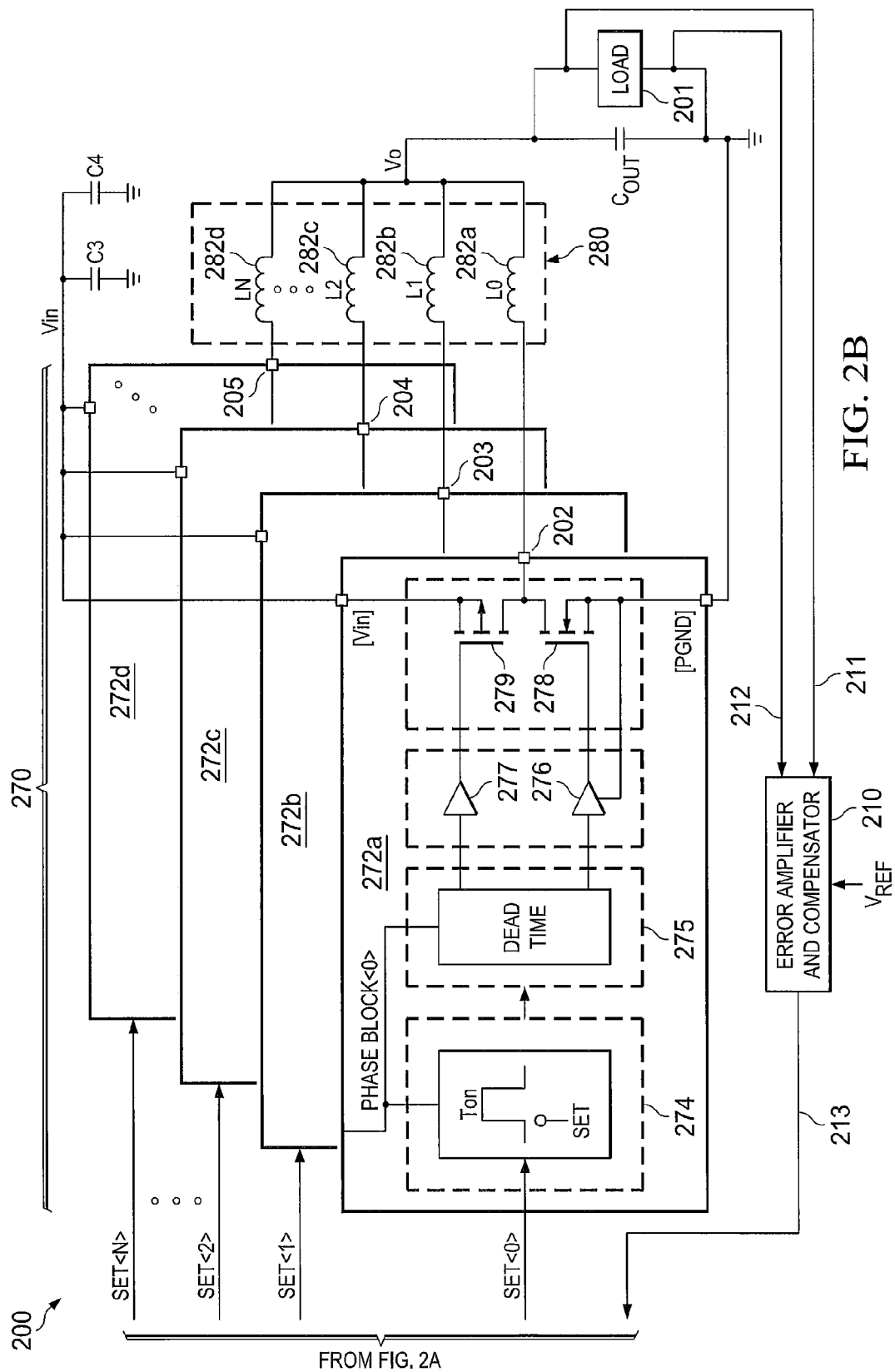

FIG. 2 is a block diagram of an example multiphase SMPS 200 having an interleaver using clock division. The multiphase SMPS 200 generates the timing diagram 100 in FIG. 1. The multiphase SMPS 200 supports an interleaving technique using asynchronous clock division. The multiphase SMPS 200 is described as being implemented as a multiphase sync-buck SMPS, but this disclosure is not limited to sync-buck SMPS topologies. The embodiments of this disclosure can be used in various SMPS topologies.

The multiphase SMPS 200 transfers power from a source to a load 201 while converting voltage and current characteristics to levels the applied load needs or demands. The multiphase SMPS 200 receives power from the source at an input voltage $V_{IN}$ and transmits power to the load 201 at an output voltage $V_{OUT}$ (also referred to as $V_O$). The multiphase SMPS 200 is coupled to the load 201 between a $V_{OUT}$ node and a power ground (PGND) node. The output voltage $V_{OUT}$ at the $V_{OUT}$ node is determined by the input voltage value along with the common nominal duty cycle of active interleaved phases containing switch nodes 202-205 representing the multiple phases of the SMPS 200. The switch nodes 202-205 generate the waveforms 110-140 shown in FIG. 1.

The DC output current is the sum of all DC currents from active phases. As the load increases or decreases, the characteristics of the conversion changes. For example, in response to an increase in load, the SMPS 200 raises the number of active phases. In response to a decrease in load, the SMPS 200 reduces the number of active phases. Increases or decreases in the level of output current result in changes in conversion characteristics.

As a specific and non-limiting example, in response to a decrease in load, the SMPS 200 reduces the number of active phases from N=4 to N=2. This changes the phase angle relationship amongst active phases from $$\frac{360°}{4} = 90° \text{ to } \frac{360°}{2} = 180°.$$

Figure 9:
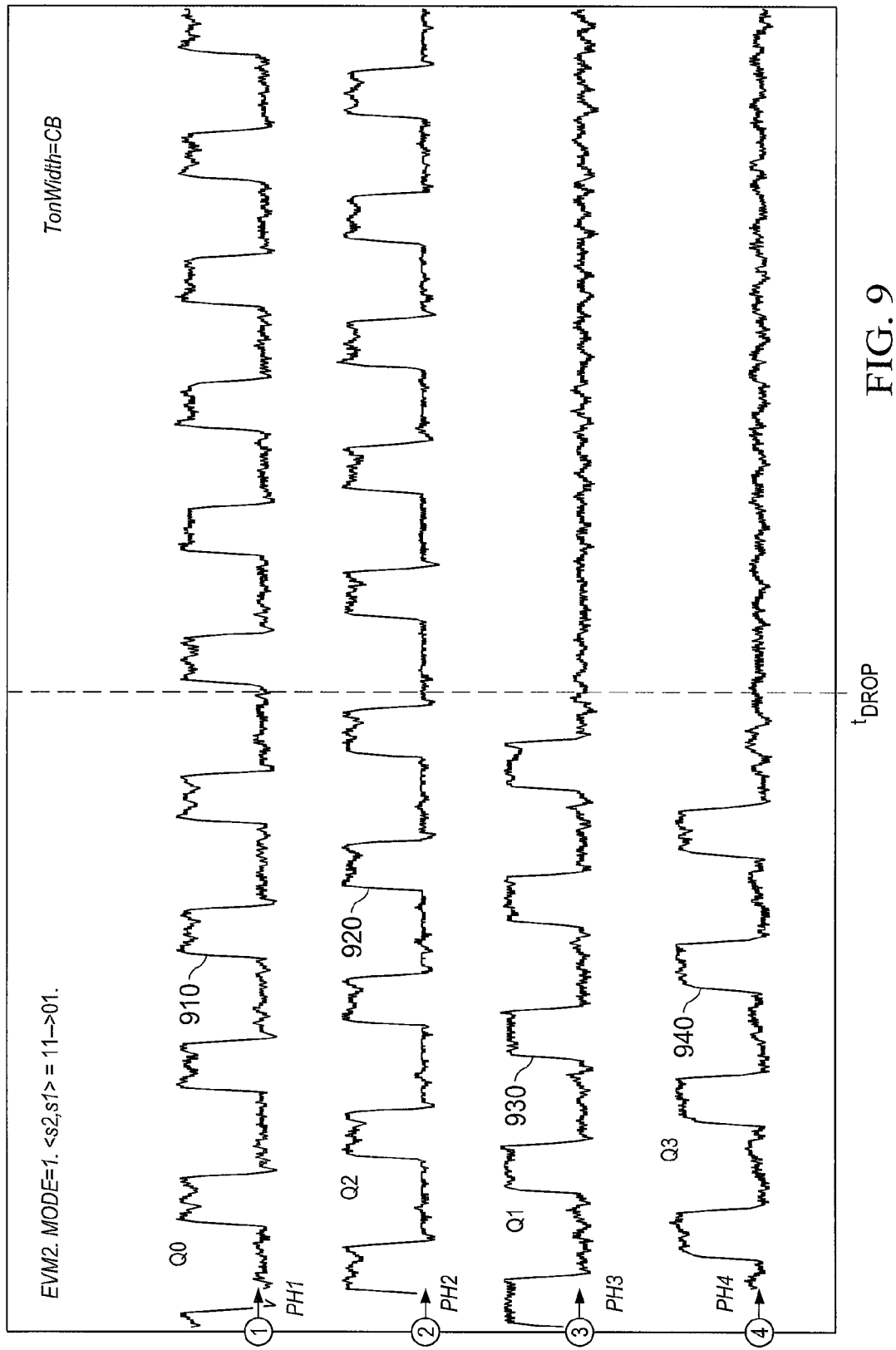
FIG. 9 is a timing diagram of an example test result executing a phase drop from four active phases to two active phases.

This example is described more particularly in relationship to FIG. 9. As another specific and non-limiting example, in response to a further decrease in load, the SMPS 200 reduces the number of active phases from N=2 to N=1. This changes the phase angle relationship from $$\frac{360°}{2} = 180° \text{ to } \frac{360°}{1} = 360°.$$

Figure 7:
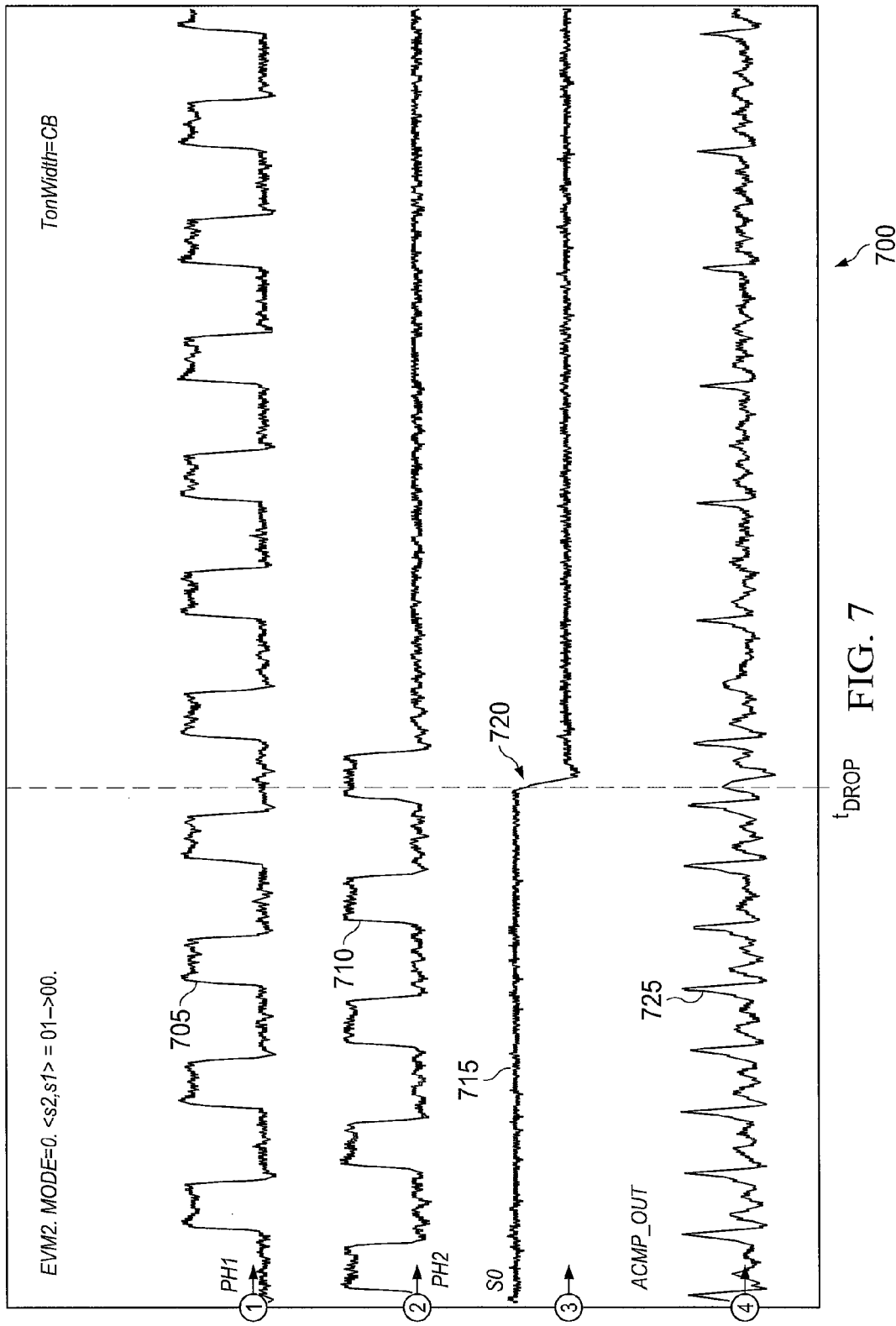
FIG. 7 is a timing diagram of an example test result executing a phase drop from two active phases to one active phase.

This example is described more particularly in relationship to FIG. 7.

As shown in FIG. 2, the SMPS 200 includes an error amplifier and compensator 210, an interleave block 220, a buck regulator 270, and an inductor capacitor (LC) filter comprised of filter inductors 280 connected to a common output capacitor $C_{OUT}$. The error amplifier and compensator 210 compares the output voltage $V_{OUT}$ to a reference voltage $V_{REF}$. The difference between $V_{OUT}$ and $V_{REF}$ determines the value of error signal 213, which is the output of 210. The error signal 213 provided by 210 determines a duty cycle for each phase. As inputs, the error amplifier and compensator 210 receives a signal 211 from the $V_{OUT}$ node and another signal 212 from the PGND node. The error amplifier and compensator 210 outputs an error signal 213 to the interleave block 220. In some embodiments, the error amplifier and compensator 210 is physically coupled between the interleave block 220 and the $V_{OUT}$ and PGND nodes. In particular embodiments, the error amplifier and compensator 210 receives the reference voltage $V_{REF}$ as an input. In other particular embodiments, the error amplifier and compensator 210 generates the reference voltage $V_{REF}$. In still other particular embodiments, the reference voltage $V_{REF}$ is programmed into the error amplifier and compensator 210.

The interleave block 220 receives as inputs the error signal 213 from the error amplifier and compensator 210 and a phase control signal 221 (PHASE_CTRL) from a phase controller (not shown). The interleave block 220 operating in conjunction with 210 in closed loop operation converges the error signal 213 to the steady state value that yields the output voltage $V_{OUT}$ tracking the reference voltage $V_{REF}$. The interleave block 220 controls the duty cycles of the switch nodes 202-205 using the error signal 213. More particularly, based on the amplitude of the error signal 213, the interleave block 220 controls both the length of the switching period T of each switch node 202-205 and the length of time that each switch node 202-205 is turned ON during the switching period T.

The interleave block 220 outputs a group 222 of signals to the buck regulator 270, including a number of SET signals corresponding one-to-one to a number of phase blocks 272a-272d in the buck regulator 270. The interleave block 220 interleaves the multiple phases in the buck regulator 270 by transmitting time-shifted SET signals to the buck regulator 270 in a firing sequence. Each SET signal in the group 222 causes the corresponding phase block receiving the SET signal to turn ON. The interleave block 220 includes a timing capacitor and adjustable current source (ISRC) block 230, a high-speed comparator 240, a dynamic clock divider 250, and a SET distribution logic block 260. A comparator loop is formed by the timing capacitor and adjustable ISRC block 230 and the high-speed comparator 240. The timing capacitor and adjustable ISRC block 230 and the high-speed comparator 240 convert the error signal 213 into a comparator output signal 245 (shown in FIG. 2 as a superposition of SETs SETS<N:1>). The comparator output signal 245 is a rising-edge signal that sets up "ON" times within the buck regulator 270. As inputs, the timing capacitor and adjustable ISRC block 230 receives the phase control signal 221 and a reset feedback signal from the high-speed comparator 240 (which represents the comparator output signal 245). The timing capacitor and adjustable ISRC block 230 outputs a ramp signal 235.

The high-speed comparator 240 compares the error signal 213 to the ramp signal 235. The high-speed comparator 240 includes a comparator having at least two input terminals. A non-inverting input terminal receives the ramp signal 235, and the inverting input terminal receives the error signal 213. When the ramp signal 235 is greater than the error signal 213, the high-speed comparator 240 outputs a high value. When the error signal 213 is greater than the ramp signal 235, the high-speed comparator 240 outputs a low value. In some embodiments, the high-speed comparator 240 optionally includes a monostable.

The dynamic clock divider 250 divides the superposition of SETs in the comparator output signal 245 using a scalable D flip-flop (DFF) clock (CLK) divider. The dynamic clock divider 250 includes a number of DFFs 252a-252d forming multiple stages. A current output terminal (Q) of each DFF 252a-252d is coupled to a respective input terminal of the SET distribution logic block 260, so the DFFs 252a-252d send their current outputs Q<0> through Q<N> to the logic block 260. The current output terminals and the data input terminals of the DFFs 252a-252d form a ring, where the current output terminal of each DFF 252a-252d is coupled to an input data terminal (D) of another DFF.

The SET distribution logic block 260 maps the current outputs to $T_{ON}$ monostables corresponding to a predetermined number of active phases and a predetermined firing sequence. The SET distribution logic block 260 determines which phases to add or drop. In some embodiments, the SET distribution logic block 260 controls reverse coupled pairs of windings. In the case of coupled phases of windings, the SET distribution logic block 260 selects pairs of anti-phase phases to add or drop. In the case of non-coupled phases of windings, the SET distribution logic block 260 selects one or more phases to add or drop without considering whether the phases are anti-phase.

The buck regulator 270 steps up the current level and steps down voltage from the input voltage level $V_{IN}$ to the output voltage level $V_{OUT}$. The buck regulator 270 includes a number of phase blocks 272a-272d. Each phase block 272a-272d corresponds one-to-one to a DFF in the dynamic clock divider 250. Each phase block 272a-272d includes a $T_{ON}$ monostable 274, a delay 275, a pair of gate drivers 276-277, and a pair of switches 278-279. The switches 278-279 in each phase block 272a-272d can share a common output node, namely a switch node 202-205, respectively. The switches 278-279 include either a p-channel or n-channel metal oxide semiconductor field effect transistor (MOSFET) as a control switch and an n-channel MOSFET as a synchronous switch. As an example, the p-channel MOSFET switch 279 used as a control switch includes a source coupled to the input voltage node $V_{IN}$, a drain coupled to the common output node, and a gate coupled to the output of a gate driver 277. The n-channel MOSFET switch 278 used as a synchronous switch includes a source coupled to the power ground node PGND, a drain coupled to the common output node, and a gate coupled to the output of the gate driver 276.

The filter 280 includes a number of inductors 282a-282d (L0, L1, L2, ... LN) along with $C_{OUT}$. Each inductor 282a-282d filters the output of the switch node to which that inductor is coupled. The filter 280 combines the filtered outputs of the switch nodes 202-205 and provides the combined signal to the $V_{OUT}$ node. In some embodiments, the number of inductors 282a-282d, the number of switch nodes 202-205, the number of phase blocks 272a-272d, the number of SET signals in the group 222, and the number of DFFs 252a-252d are equal.

Figure 3:
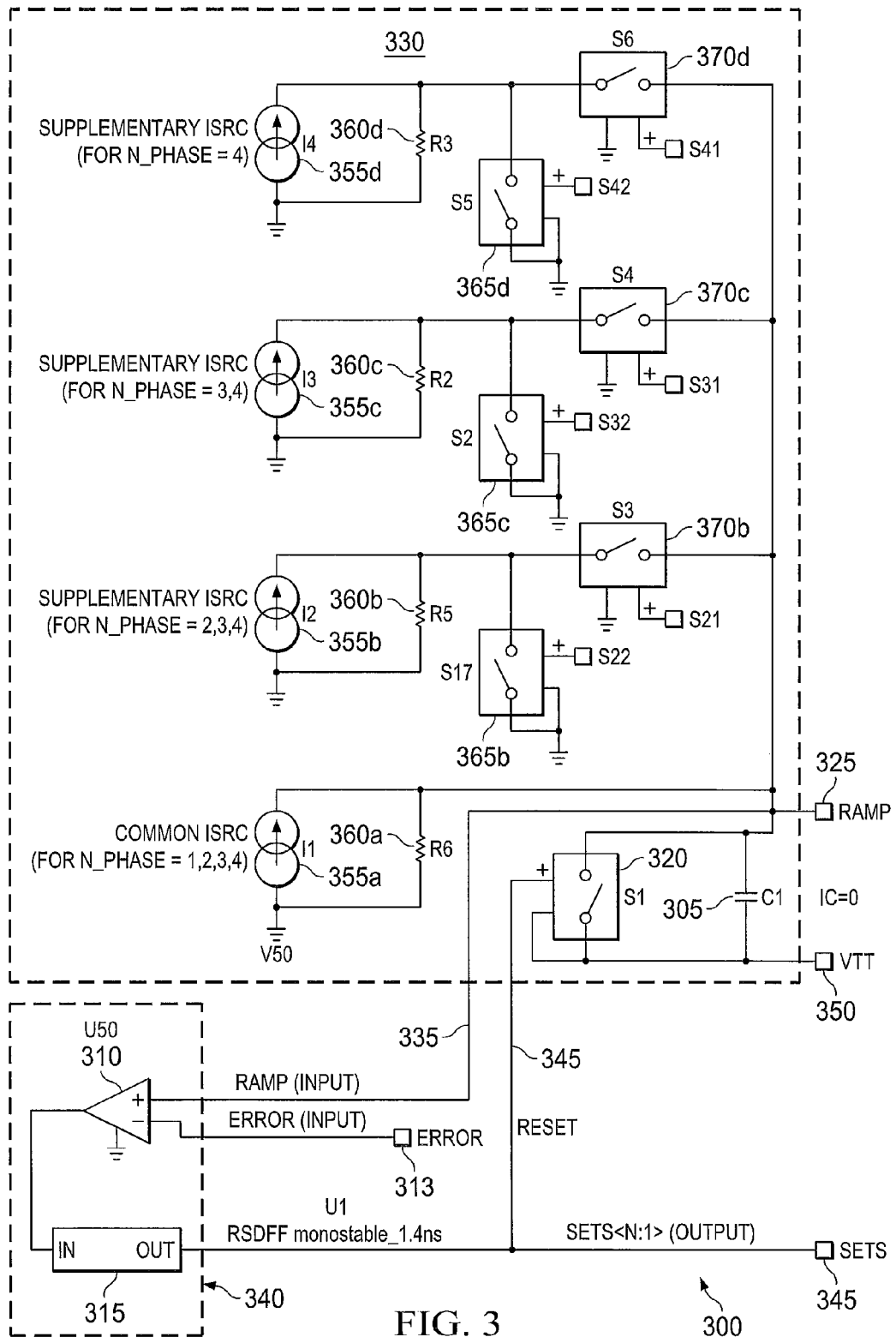
FIG. 3 is a schematic of an example comparator loop in the multiphase SMPS.

FIG. 3 is a schematic of an example comparator loop 300 in the multiphase SMPS 200. FIG. 3 illustrates a behavioral model of the comparator loop 300 as opposed to a transistor-level model. The comparator loop 300 is an example of the comparator loop of the interleave block 220 in FIG. 2. The comparator loop 300 includes a timing capacitor 305, an ISRC block 330, and a high-speed comparator 340.

The high-speed comparator 340 includes a comparator 310 and a monostable 315. The comparator 310 compares the voltage levels of two input signals 335 and 313 to each other. The monostable 315 is an edge-triggered circuit component that starts a counter in response to receiving a rising edge signal, counts a predetermined time period, and upon elapse of the predetermined time period times out. When the monostable 315 times out, the output of the monostable 315 falls to a low value (such as a logical 0 value or ground potential). The predetermined time period is a tiny fraction of the switching period T. For example, the predetermined time period of the monostable 315 is 1.4 nanoseconds (ns) and the switching period T is approximately 50 ns.

The output of the high-speed comparator 340 is the superposition of SETs in a comparator output signal 345 (shown in FIG. 3 as SETS<N:1>). The high-speed comparator 340 transmits its rising-edge output to the dynamic clock divider 250 and to an active discharge switch 320. The rising-edge of the comparator output signal 345 resets a voltage $V_{RAMP}$ at a ramp terminal 325 and starts a new cycle. As an example, the comparator output signal 345 is shown as a waveform 645 in FIG. 6 described below.

The signal amplitude of the voltage $V_{RAMP}$ is related to the switching period T for an active phase. More specifically, the period $T_{OFF}$ for an active phase is related to the amplitude of the voltage $V_{RAMP}$. The period of the high-speed comparator 340 can be expressed as $$\frac{T_{PHASE}}{N_{PHASE}},$$

or the switching period over the number of active phases ($T_{SWITCHING}/N$).

The sizes of the timing capacitor 305 and current sources 355a-355d are based on a target switching frequency per phase. For example, for a target switching frequency of 20 MHz per phase and two phase operation is assigned, currents I1=I2 for the current sources 355a-355b, which charge the timing capacitor 305 in 25 ns.

The adjustable ISRC block 330 is coupled to a ramp terminal 325 and a VTT terminal 350. The ISRC block 330 receives the comparator output signal 345 as a feedback reset signal into a positive input terminal of the active discharge switch 320. The active discharge switch 320 is coupled in parallel with the timing capacitor 305 and is controlled by the comparator output signal 345. The active discharge switch 320 controls whether the timing capacitor 305 is in a charging state or a discharging state. When the voltage of the ramp signal 335 exceeds the error signal 313, the active discharge switch 320 closes to reset the voltage across the timing capacitor 305 to a low voltage (such as 0 volts). When the active discharge switch 320 is closed, the timing capacitor 305 discharges. When the active discharge switch 320 is open, the timing capacitor 305 charges.

The positive input terminal of the active discharge switch 320 is coupled to the output terminal of the monostable 315. In response to the voltage of the ramp signal 335 exceeding the error signal 313, the comparator output signal 345 rises from a logical 0 to a logical 1, and the monostable 315 transmits the comparator output signal 345 for a predetermined period of time (such as 1.4 ns). During this time, the active discharge switch 320 is closed, and the timing capacitor 305 fully discharges. The timing capacitor 305 is referred to as being reset when the voltage across the timing capacitor 305 falls to a fully discharged value. Upon elapse of the predetermined period of time, the monostable 315 times out, and the comparator output signal 345 declines from a logical 1 to a logical 0. Accordingly, the monostable 315 provides robustness to the SMPS 200 in the form of a repeatable discharge time for the timing capacitor 305 that is long enough to fully discharge.

In response to receiving a low comparator output signal 345, the active discharge switch 320 opens, which causes the timing capacitor 305 to charge. A reset occurs when the timing capacitor 305 reaches a fully charged state. More particularly, when the timing capacitor 305 reaches a full charge, the voltage $V_{RAMP}$ exceeds the voltage $V_{ERROR}$ of the error signal 313. In response to determining that $V_{RAMP}$ exceeds $V_{ERROR}$, the output signal 345 rises to a logical 1, which closes the active discharge switch 320 and causes the timing capacitor 305 to discharge to a low voltage. In this way, the timing capacitor 305 reaching a fully charged state causes a subsequent reset of the timing capacitor 305. This cycle of a fully charged timing capacitor 305 causing a subsequent reset of the timing capacitor 305 and a fully discharged timing capacitor 305 reciprocally causing a subsequent charging of the timing capacitor 305 repeats indefinitely.

The timing capacitor 305 is charged by a charging current (IC), which includes a combination of the electrical currents from ISRC circuits in the adjustable ISRC block 330. The adjustable ISRC block 330 includes a number of ISRC circuits, where the number equals the number of phases in the SMPS 200. Each ISRC circuit includes a constant current source 355a-355d and a parallel resistor 360a-360d that are used to generate a specified amount of current for one or more phases. The current source values are roughly matched such that each current source outputs approximately the same amperage. The ISRC circuits include one common ISRC circuit and one or more supplementary ISRC circuits. The common ISRC circuit generates current for all of the phases. Each supplementary ISRC circuit generates current for a unique number of phases, from 1 through N−1 phases (where N is the number of phases).

In the example shown, the ISRC block 330 includes a total of N=4 phases, which are active or inactive based on the amount of load applied to the $V_{OUT}$ node of the SMPS 200. The first of the ISRC circuits is the common ISRC, which generates current for N=4 phases (N_PHASE=1, 2, 3, 4). The second ISRC circuit is a supplementary ISRC circuit that generates current for N−1=3 phases (N_PHASE=2, 3, 4). The third ISRC circuit is a supplementary ISRC circuit that generates current for N−2=2 phases (N_PHASE=3, 4). The fourth ISRC circuit is a supplementary ISRC circuit that generates current for N−3=1 phases (N_PHASE=4).

The first (common) ISRC circuit includes the resistor 360a coupled in parallel with the constant current source 355a, and both are coupled between the ramp terminal 325 and ground potential. The constant current source 355a generates an electrical current I1.

The remaining ISRC circuits include the resistors 360b-360d coupled in parallel with the constant current sources 355b-355d, which generate electrical currents I2-I4. Each supplementary ISRC circuit also can include parallel switches 365b-365d (also referred to as a shunt switch) that are optional for most applications and series switches 370b-370d. Each parallel switch 365b-365d when closed couples the associated current sources 355b-355d to a ground potential to prohibit charging of timing capacitor 305. Each series switch 370b-370d when closed couples the associated current sources 355b-355d to the ramp terminal 325. The parallel switches are OFF whenever the series switches are ON, and the parallel switches are ON whenever the series switches are OFF. Each supplementary ISRC circuit charges the timing capacitor 305 when two, three or four phases are active (N_PHASE=2, 3, 4) by providing an open shunt switch 365b-365d and a closed series switch 370b-370d.

In some embodiments, the timing capacitor 305 charges in accordance with Equation (1), where iCtot is the instantaneous current through the timing capacitor 305, $$\frac{\partial V}{\partial t}$$

is the rate of voltage change at a specific point in time, and C is the constant capacitance (measured in Farads) of the timing capacitor 305:

$$iCtot = C\frac{\partial V}{\partial t} \tag{1}$$

The charging current (IC) that flows through the timing capacitor 305 can be expressed by Equation (2):

$$IC = C_1 \frac{(V_{RAMP} - V_{TT})}{T_{RAMP}} \quad (2)$$

The value of the charging current is determined based on the number of active phases. Equations (3)-(6) show that the charging current includes a combination of the electrical currents from the active ones of the current sources 355a-355d. For example, in the ISRC block 330, if one phase is active, the charging current includes electrical current from the constant current source 355a of the common ISRC as shown in Equation (6). If two phases are active, the charging current includes electrical currents from the constant current source 355a-355b as shown in Equation (5).

$$IC \cong I_1 + I_2 + I_3 + I_4, \text{ for } N=4 \text{ active phases} \quad (3)$$

$$IC \cong I_1 + I_2 + I_3, \text{ for } N=3 \text{ active phases} \quad (4)$$

$$IC \cong I_1 + I_2, \text{ for } N=2 \text{ active phases} \quad (5)$$

$$IC \cong I_1, \text{ for } N=1 \text{ active phases} \quad (6)$$

As a specific and non-limiting example, assume I1=10 mA and a 7 mF timing capacitor 305 is fully charged. When four phases are active in the multiphase SMPS 200, the timing capacitor 305 is charged by the charging current according to Equation (3), where I1=I2=I3=I4=10 mA and IC=40 mA. The rate at which the timing capacitor 305 charges is the rate of voltage change $$\left(\frac{\partial V}{\partial t}\right)$$

according to Equation (1), where $$\frac{\partial V}{\partial t} = \frac{IC}{C} = \frac{40 \text{ mA}}{7 \text{ mF}} = 5.714 \frac{\text{volts}}{\text{second}}.$$

When two phases are active in the SMPS 200, the timing capacitor 305 is charged by the charging current according to Equation (5), where I1=I2=10 mA and IC=20 mA. The rate at which the timing capacitor 305 charges is the rate of voltage change $$\left(\frac{\partial V}{\partial t}\right)$$

according to Equation (1), where $$\frac{\partial V}{\partial t} = \frac{IC}{C} = \frac{20 \text{ mA}}{C} = 2.857 \frac{\text{volts}}{\text{second}}.$$

Accordingly, the four active phases charge the capacitor at a rate $$\left(\frac{\partial V}{\partial t} = 5.714 \frac{\text{volts}}{\text{second}}\right)$$

twice as fast as the charging rate $$\left(\frac{\partial V}{\partial t} = 2.857 \frac{\text{volts}}{\text{second}}\right)$$

of two active phases. Half as much time elapses for four phases to fully charge the timing capacitor 305 compared to the amount of time for two phases to fully charge the timing capacitor 305.

FIGS. 4A-4D are schematics of examples of a dynamic clock divider. The dynamic clock divider generates a divided clock signal. As the dynamic clock divider includes a single ring, the dynamic clock divider is also referred to as a ring counter. A single ring is scalable to divide-by 2, 3, 4 ... N.

Figure 4A:
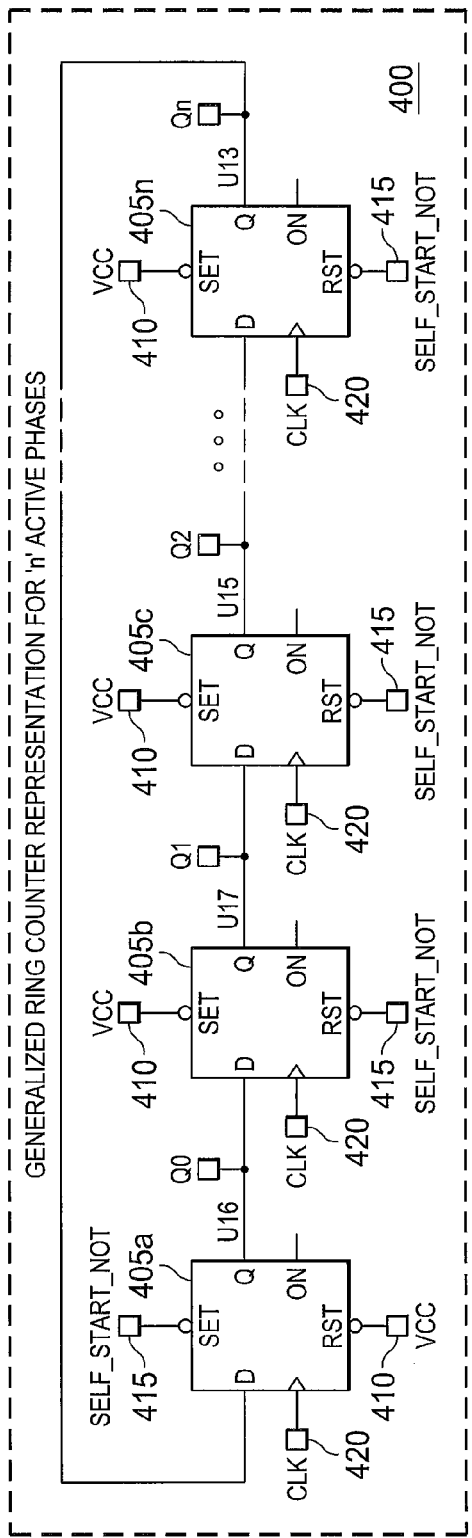
Figure 4B:
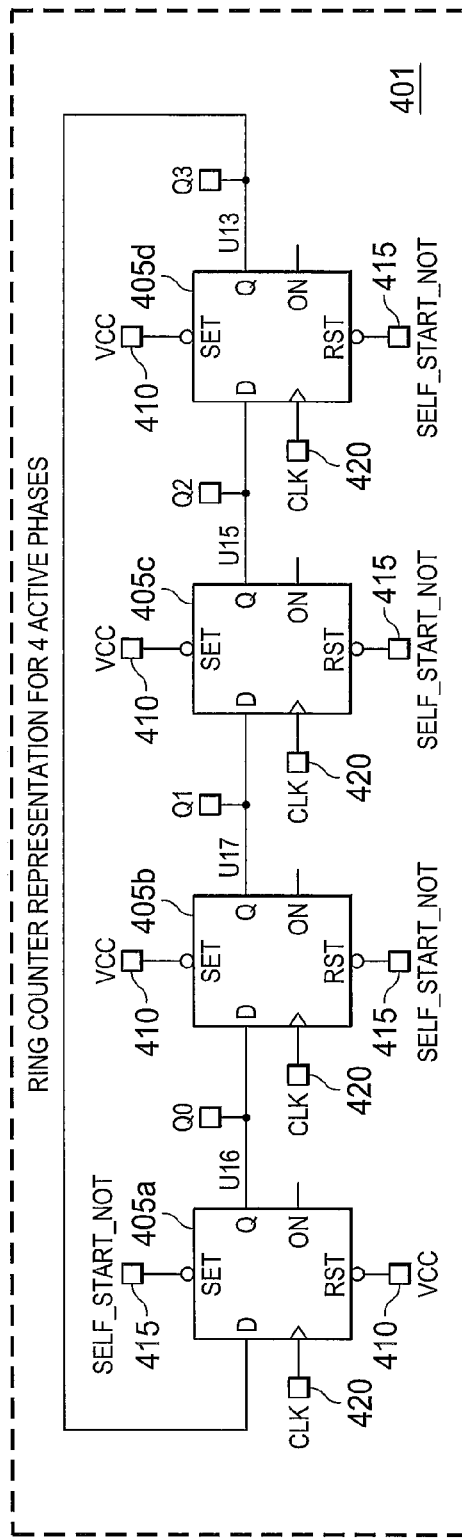

FIGS. 4A-4D show dynamic clock dividers 400-403 including rings representing N, 4, 3, and 2 active phases, respectively. The dynamic clock dividers 401-403 of FIGS. 4B-4D are examples of the dynamic clock divider 400 in FIG. 4A, where the numbers of active phases are discrete. Components of the dynamic clock divider 400 are also components of the dynamic clock dividers 401-403, and a description of the dynamic clock divider 400 also correspondingly describes the dynamic clock dividers 401-403.

The dynamic clock divider 400 is an example of the dynamic clock divider 250 in FIG. 2. Accordingly, DFFs 405a-405n forming multiple stages of the dynamic clock divider 400 are similar to the DFFs 252a-252d of the dynamic clock divider 250 in FIG. 2. In the dynamic clock divider 400, one set of DFFs include reset terminals (RST) coupled to a common connector node 410 that supplies power at a voltage VCC and set terminals (SET) coupled to a SELF_START_NOT node 415. An alternating set of DFFs include set terminals (SET) coupled to the common connector node 410 and reset terminals (RESET) coupled to the SELF_START_NOT node 415. A clock terminal (CLK) of each DFF receives a clock signal from a clock node 420. As shown in FIG. 2, the clock signal represents the comparator output signal 245.

This embodiment of the dynamic clock divider 400 is not self-starting, and an initialization process is used. Upon start-up, the first DFF 405a is initialized at "1," while the subsequent DFFs 405b-n are initialized at "0." All of the DFFs in the ring are positive edge triggered, meaning the signal at a current output (Q) follows the data signal (D) for each rising clock edge a DFF receives. The ring architecture of the dynamic clock divider 400 does not yield cumulative delay as more phases are added.

The ring of the dynamic clock divider 400 acts as a distributor of SET commands, and a SET distribution logic block 260 provides correction in mapping to meet the requirements of the case of coupled inductors. The ring distributes comparator edges to individual phase $T_{ON}$ monostables through the SET distribution logic block 260 in between the dynamic clock divider 400 and the $T_{ON}$ monostables 274.

Figure 5A:
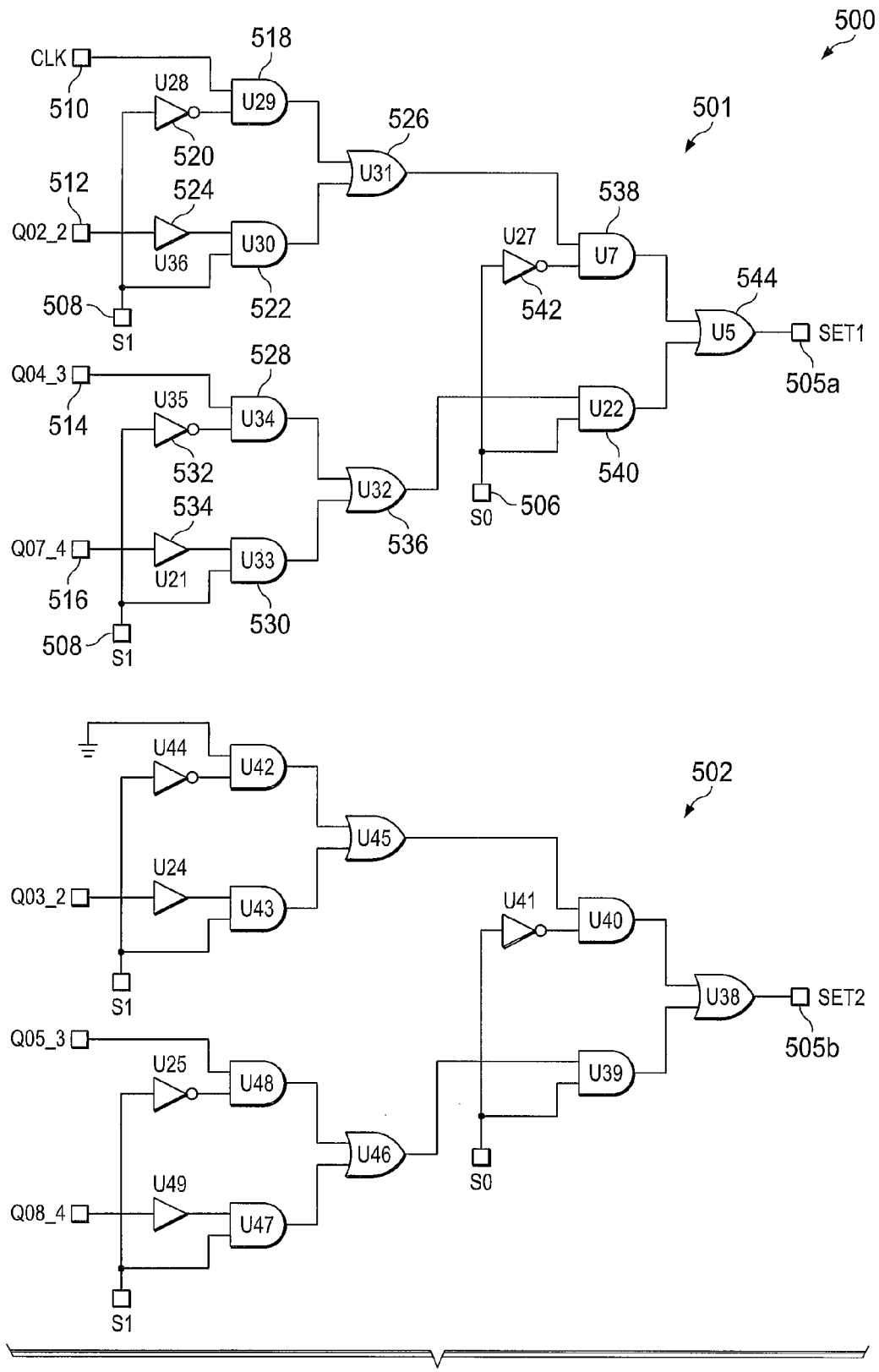
FIGS. 5A and 5B are a schematic of an example set terminal (SET) distribution logic block.
Figure 5B:
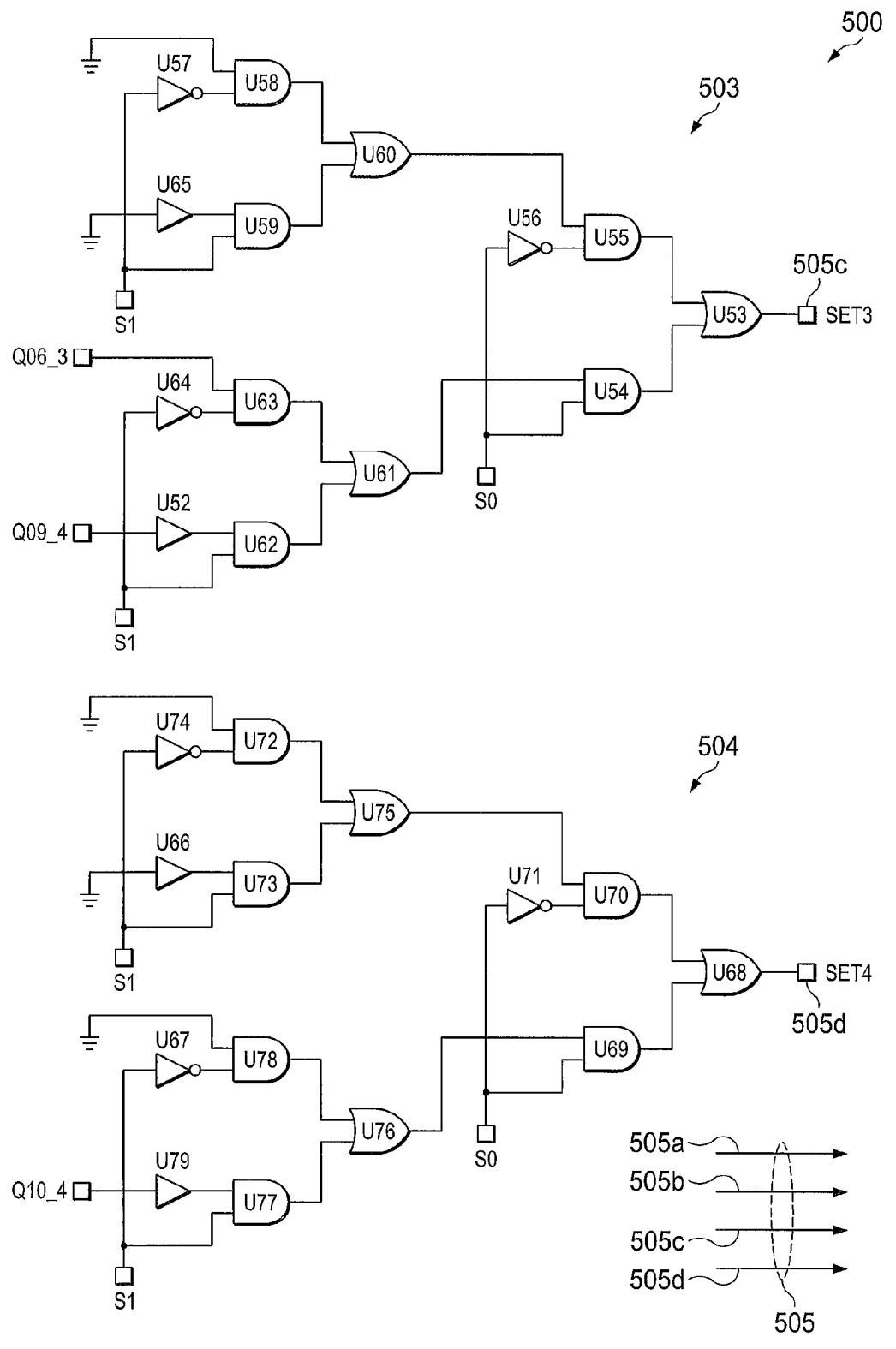

FIG. 5 is a schematic of an example set terminal (SET) distribution logic block 500. In embodiments where the multiphase SMPS 200 includes coupled pairs of inductors, the outputs (Qs) of the dynamic clock divider cannot always map to a given phase, and the SET distribution logic block 500 defines the phase-to-inductor relationship. The SET distribution logic block 500 determines which inductor receives signals from which phase.

The SET distribution logic block 500 is an example of the SET distribution logic block 260 in FIG. 2. The SET distribution logic block 500 receives inputs from a phase controller and a dynamic clock divider 250, 400. The SET distribution logic block 500 transmits outputs to the buck regulator 270. The SET distribution logic block 500 includes a number of phase mappers, one per phase in the multiphase SMPS 200. In the example shown in FIG. 5, the SET distribution logic block 500 includes four phase mappers 501-504 for mapping N=4 phases. Together, the four phase mappers 501-504 output a group 505 of SET signals 505a-505d, which could represent the group 222 of SET signals. The phase controller is capable of sending different information to the different phase mappers 501-504

Each phase mapper 501-504 is a combinational logic circuit that includes digital logic circuit components (such as buffers, inverters, AND gates, and OR gates). As shown here, the phase mappers 501-504 have the same structure and process different sets of inputs. The phase mapper 501 receives six inputs, including a clock signal on a clock node 510 (CLK), information from the PHASE_CTRL signal on S0 and S1 nodes 506-508, and outputs from phases 2-4 of the dynamic clock divider 250, 400. From the dynamic clock divider 250, 400, the phase outputs (Q0, <Q0>)-(Q3, <Q3>) are coupled to nodes 510-516.

A first AND gate 518 receives two inputs, one from the S1 node 508 through a first inverter 520 and another from the clock node 510. The first inverter 520 receives and negates the signal from the S1 node 508 and transmits the negated signal to the first AND gate 510. A second AND gate 522 receives two inputs, one from the S1 node 508 and another from the node 512 through a first buffer 524. The first buffer 524 receives a signal from the node 512 and provides that signal to the second AND gate 522. The first and second AND gates 518 and 522 transmit resulting Boolean outputs to a first OR gate 526. The first OR gate 526 transmits the resulting Boolean output. A third AND gate 528, a fourth AND gate 530, a second inverter 532, a second buffer 534, and a second OR gate 536 are similarly arranged to process signals from the nodes 514-516.

A fifth AND gate 538, a sixth AND gate 540, a third inverter 542, and a third OR gate 544 are arranged to process outputs of the OR gates 526, 536 and information from the PHASE_CTRL signal on the S0 node 506. The input terminal of the third inverter 542 receives input from the S0 node 506. The fifth AND gate 538 receives inputs from the first OR gate 526 and from the third inverter 542. The sixth AND gate 540 receives inputs from the S0 node 506 and from the second OR gate 536. The fifth and sixth AND gates 538-540 transmit resulting Boolean outputs to the third OR gate 544. The third OR gate 544 outputs the SET signal 505a, which is provided to an input terminal of the $T_{ON}$ monostable 274 within a phase block 272a of the buck regulator 270. The remaining phase mappers 502-504 operate in a similar manner to provide outputs to the SET signals 505b-505d.

Figure 6:
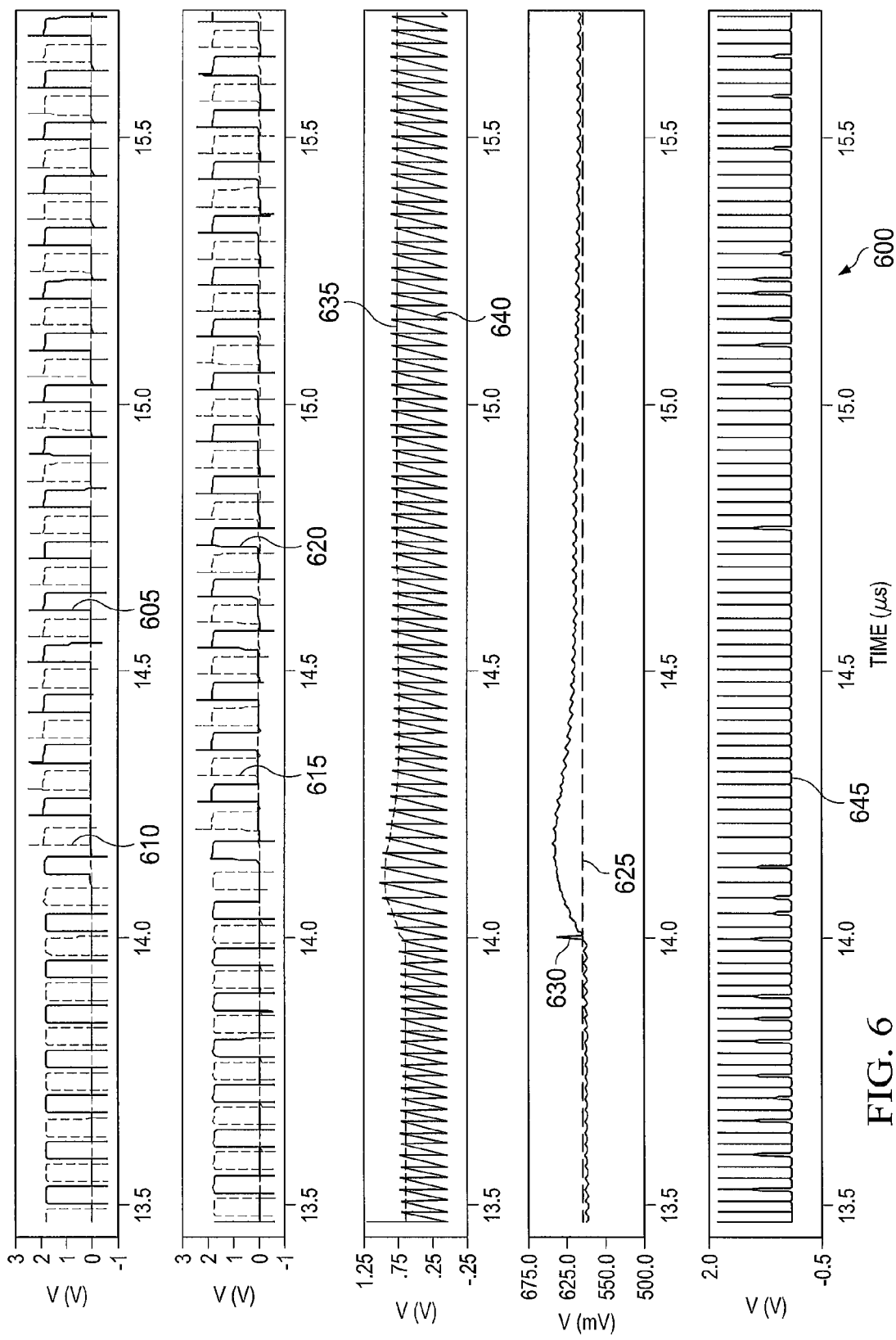
FIG. 6 is a timing diagram of an example simulation of converting an error signal to a superposition of SET input signals.

FIG. 6 is a timing diagram 600 of an example simulation of converting an error signal to a superposition of SET input signals. The timing diagram 600 includes multiple waveforms representing signals measured from 13.5 μs through 15.7 μs of a simulation. The horizontal axis represents time, and the vertical axis represents voltage.

A "phase 1" waveform 605 represents the voltage of the signal output by the switch node 202 of the multiphase SMPS 200. A "phase 2" waveform 610 represents the voltage of the signal output by the switch node 203 of the SMPS 200. A "phase 3" waveform 615 represents the voltage of the signal output by the switch node 204 of the SMPS 200. A "phase 4" waveform 620 represents the voltage of the signal output by the switch node 205 of the SMPS 200. Each waveform 605-620 shows that the respective switch node 202-205 outputs 2.0V when turned ON and 0V when turned OFF. The waveforms 605-620 are displayed on voltage scales from −1V to 3V, the waveform 605 is anti-phase from the waveform 610, and the waveform 615 is anti-phase from the waveform 620. The waveform 605 is also phase-shifted by 90° with respect to the waveform 615, and the waveform 610 is phase-shifted by 90° with respect to the waveform 620.

All of the waveforms 605-620 share the same switching period and a repeatable phase angle (90°) from one active phase to the next that is related to the number N=4 of active phases by the expression 360°/N. In the example shown, the switching period is approximately 50 ns, and the switching frequency per phase is 20 MHz per phase. The average switching period of a ramp waveform 640 (varying as a function of $V_{ERROR}$) is approximately ⅛₀ MHz or 12.5 ns for N=4 phases. If the number of active phases reduces to N=3, the switching period and switching frequency per phase remain approximately 50 ns and 20 MHz, respectively, and the average switching period of the ramp waveform 640 increases to 1/60 MHz or 16.67 ns. If the number of active phases reduces to N=2, the switching period and switching frequency per phase remain approximately 50 ns and 20 MHz, respectively, and the average switching period of the ramp waveform 640 increases to 1/40 MHz or 25 ns.

A reference voltage waveform 625 represents the voltage level ($V_{REF}$=600 mV) that the load 201 currently needs or desires. An output voltage waveform 630 represents the output voltage $V_{OUT}$ from the output voltage node. The waveforms 625-630 are displayed on a scale from 500 mV to 675 mV. From 13.5 ms to 14.0 μs, the voltages of the waveforms 625-630 are approximately the same ($V_{OUT} \approx V_{REF}$). Ripples in the output voltage waveform 630 show that the output voltage $V_{OUT}$ cyclically varies from the reference voltage $V_{REF}$ by a small amount, such as 10 mV between 590 mV and 600 mV.

At 14.0 μs, an error caused by a system load transient occurs so that the output voltage waveform 630 and a reference voltage waveform 625 are not approximately the same. More particularly, the output voltage $V_{OUT}$ spikes above the reference voltage $V_{REF}$ by approximately 15 mV. During the next 0.1 μs from 14.0 μs to 14.1 μs, the output voltage $V_{OUT}$ rises to approximately 640 mV, which is 40 mV greater than the reference voltage $V_{REF}$. In response, the interleave block 220 corrects the output voltage $V_{OUT}$ to a value that is approximately the same as the reference voltage. Within 1.375 μs after the error, the output voltage $V_{OUT}$ converges to the reference voltage $V_{REF}$. From 15.375 μs through 15.75 μs and beyond, ripples in the output voltage waveform 630 vary the output voltage $V_{OUT}$ by approximately 10 mV between 600 mV and 610 mV.

The error waveform 635 represents the error signal 213, 313 that is output from the error amplifier and compensator 210. A ramp waveform 640 represents the ramp signal 235, 335 output from the ISRC block 230, 330. More particularly, the ramp waveform 640 represents the voltage of the timing capacitor 305. The ramp waveform 640 rises as the timing capacitor 305 charges, and the waveform 640 declines as the timing capacitor 305 discharges. The waveforms 635-640 on a voltage scale from −0.25V to 1.25V. A comparator output waveform 645 represents the signal output from the high-speed comparator 240, 340. The comparator output waveform 645 is displayed on a voltage scale from −0.5V to 2.0V.

An iteration begins each time the voltage of the ramp waveform 640 rises from a low value to a high value. When the ramp waveform 640 intersects and crosses the error waveform 635, the comparator output waveform 645 spikes up to a logical 1 value (shown as 1.8V). The comparator output waveform 645 remains at the logical 1 value for the 1.4 ns period of the monostable 315.

When the value of the comparator output waveform 645 is at a logical 1 value, the value of the ramp waveform 640 declines to 0V as a representation of the full discharge of the timing capacitor 305. In the example shown, at 14.10097 µs, the timing capacitor 305 discharges from 1.01241V to 0V at a rate of $$\frac{\partial V}{\partial t} = 15.85029 \text{ kV/s}.$$

During the 3.879821 µs after the specific point in time (at 14.10097 µs) at which the ramp waveform 640 exceeds the error waveform 635, the voltage of the timing capacitor 305 discharges by 61.4963 mV.

Upon elapse of the 1.4 ns period of the monostable 315, the comparator output waveform 645 drops to a logical zero value shown as 0V. At this time, the timing capacitor 305 charges up again as shown by an incline of the ramp waveform 640. The waveforms 605-620 indicate that four phases are active to meet the high level of current demanded by the load 201, and the electrical current from the phases charge the timing capacitor 305 in accordance with Equation (3). The rate $$\left( \frac{\partial V}{\partial t} = \frac{IC}{C} = \frac{(I1 + I2 + I3 + I4)}{C} \right)$$

at which the capacitor 305 charges is in accordance with Equation (1). The cycle repeats, and another iteration begins when the timing capacitor 305 charges up to a voltage that exceeds the error waveform 635.

The period of the comparator output waveform 645 is proportional to the error voltage $V_{ERROR}$ of the error waveform 635. In some embodiments, the ramp waveform 640 is event-driven instead of being fixed-time driven. Every voltage value of the error signal 213, 313 corresponds one-to-one to a unique period of the high-speed comparator 240, 340. The time for the ramp waveform 640 to cross or surpass the error waveform 635 is dependent on of the value of the error waveform 635. The period of the comparator output waveform 645 defines the up-clocking frequency of the comparator output signal 245, 345 that sets the DFFs of the clock divider 250, 400. The comparator output waveform 645 is the superposition of all the SET command signals for all active phases. Each period of the comparator output waveform 645 is sequentially distributed to the clock node 420 of the DFF for each active phase (as shown in FIG. 8 described below).

FIG. 7 is a timing diagram 700 of an example test result of executing a phase drop. The timing diagram 700 includes multiple waveforms representing signals plotted according to a horizontal axis representing ten (10) major divisions of time and a vertical axis representing voltage.

A "phase 1" waveform 705 represents the voltage of the signal output by the switch node 202 of the multiphase SMPS 200. A "phase 2" waveform 710 represents the voltage of the signal output by the switch node 203 of the SMPS 200. The waveform 705 is anti-phase from the waveform 710, and phases 1 and 2 provide power to the load 201 demanding a mid-range amount of power. A phase controller outputs a phase control signal (PHASE_CTRL) 715. The amplitude of the phase control signal 715 represents the demand that the load 201 applies to the $V_{OUT}$ output voltage node. More particularly, the voltage level of the phase control waveform 715 indicates to the SMPS 200 a number of active phases. For example, the phase control signal 715 shows a step-down in amplitude at a time $t_{DROP}$, which indicates that the demand reduces from a heavier load to a lighter load. In response to the reduction, a declining edge 720 indicates to the SMPS 200 a reduction in the number of active phases. The value of the waveform 710 falls to a low value (such as 0V corresponding to a light load) from a high value (such as 5.0V corresponding to a heavy load), and the distribution logic block 260, 500 stops transmitting a phase 2 SET signal from the output terminal 505b. Further, in response to the phase control signal 715 falling to a low value, the series switches 370b-370d turn OFF (open). While the demand from the load is heavy before time $t_{DROP}$, the first and second switch nodes 202-203 supply power to the load as shown by the active switching waveforms 705-710. When the level of demand from the load is light after time $t_{DROP}$, the second switch node 203 ceases to supply power to the load as shown by the active switching in the waveform 705 and the constant zero value in the waveform 710. A buffered comparator output waveform 725 represents a test mode buffered output from the high-speed comparator 240, 340.

As active phases are added or dropped, no intrinsic recovery time applies to the interleaved phases. Within one period, the multiphase SMPS 200 adjusts to and locks into a new phase angle relationship according to the new number of active phases. Some interleaving methods may require a settling interval, such as between 5-20 switching periods, in order for a multiphase SMPS to lock into a new phase angle relationship.

Figure 8A:
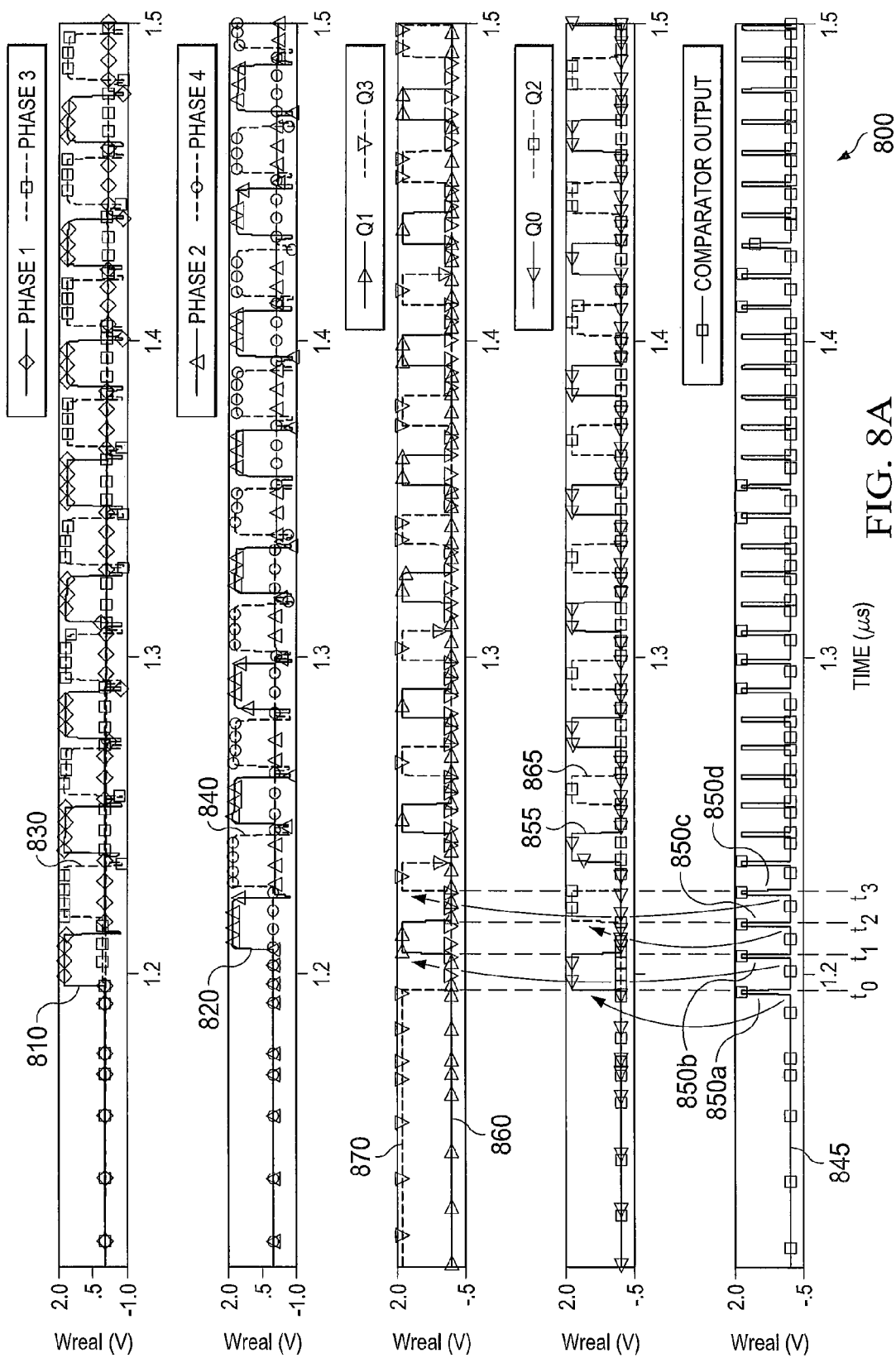
FIGS. 8A-8B are collectively a timing diagram of an example simulation of dividing a superposition of SET input signals using a dynamic clock divider.
Figure 8B:
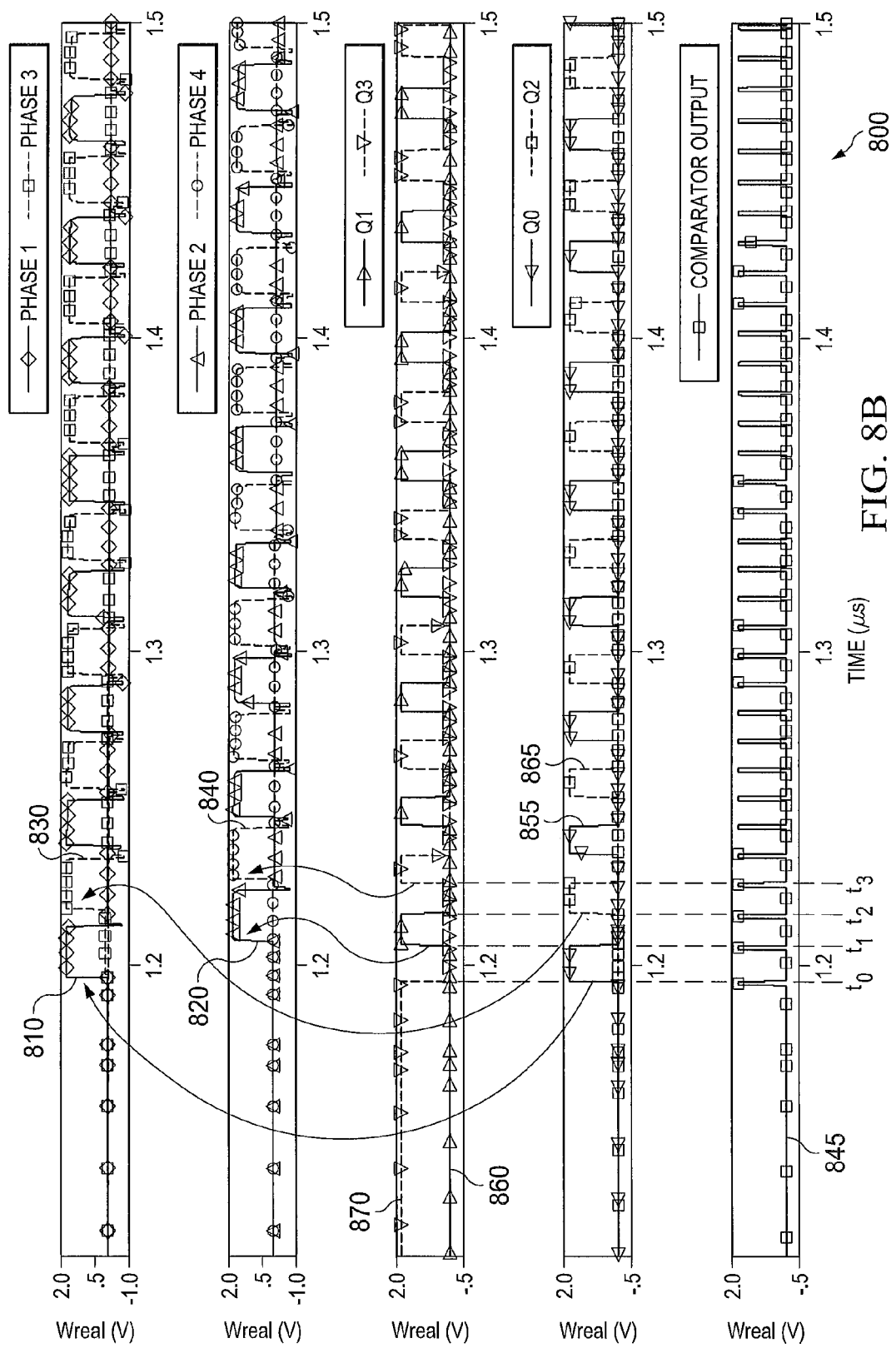

FIGS. 8A-8B are collectively a timing diagram 800 of an example simulation of dividing a superposition of SET input signals using a dynamic clock divider.

Waveforms 810-840 represent the voltages of the signals output by the switch nodes 202-205, respectively, of the multiphase SMPS 200. The waveforms 810-840 show that the switch nodes 202-205 output 2.0V when turned ON and 0V when turned OFF. The waveform 830 is anti-phase from the waveform 810, and the waveform 840 is anti-phase from the waveform 820. The waveform 830 is phase-shifted by 90° with respect to the waveform 820, and the waveform 840 is phase shifted by 90° with respect to the waveform 830. The waveforms 810-840 share the same switching period and a repeatable phase angle (90°) that is related to the number N=4 of active phases. The switching of the waveforms 810-840 indicate that four phases are active to meet the high level of current demanded by the load 201.

A comparator output waveform 845 (similar to the waveform 645) represents the comparator output signal 245, 345 output from the high-speed comparator 240, 340. The comparator output waveform 845 controls the outputs of the dynamic clock divider 250, 400, which control the waveforms 810-840 that are output from the switch nodes 202-205. In the example shown in FIG. 8B, the monostable-based ON-times of the waveforms 810-840 are initiated by the positive edges of Q0-Q3 waveforms 855-870, respectively. As other examples, a SET distribution logic block 260, 500 can change the relationships between the Q0-Q3 waveforms such that phases {1, 2, 3, 4} can be controlled by {Q0, Q2, Q1, Q3} or phases {1, 2} can be controlled by {Q0, Q1} as shown in FIG. 9.

Upon startup at time t0, in response to receiving an initial rising edge 850a from the comparator output waveform 845 to the clock node 420 of an asynchronous dynamic clock divider 250, 400, the DFFs 405a-405d are initialized. The current output of the first DFF 420a (Q0) is initialized as a "1," while the current outputs of the other DFFs 420b-420d (Q1, Q2, Q3) are initialized as a "0." At time t1, in response to receiving a second rising edge 850b from the comparator output waveform 845 to the clock node 420, the current output of the second DFF 420b (Q1) is set to "1," and the current outputs of the other DFFs (Q2, Q3, Q0) are set to "0." At time t2, in response to receiving a third rising edge 850c from the comparator output waveform 845 to the clock node 420, the current output of the third DFF 420c (Q2) is set to "1," and the current outputs of the other DFFs (Q3, Q0, Q1) are set to "0." At time t3, in response to receiving a fourth rising edge 850d from the comparator output waveform 845 to the clock node 420, the current output of the fourth DFF (Q3) 420d is set to "1," and the current outputs of the other DFFs (Q0, Q1, Q2) are set to "0."

FIG. 9 is a timing diagram 900 of an example test result demonstrating dynamic phase dropping from four active phases to two active phases.

A SET distribution logic block 260, 500 provides phase mapping to couple different ring counter outputs to different switch nodes 203-205 based on the number of active phases. The SET distribution logic block 260, 500 uses the group 222, 505 of SET signals to control the relationships between the clock divider's ring counter outputs {Q0, Q1, Q2, Q3} and the voltages output from the switch nodes 202-205. As described above, at a time $t_{DROP}$, the level of demand reduces from a heavy load to a lighter load. Phase waveforms 910-940 represent the voltages of the signals output by the switch nodes 202-205, respectively.

Prior to the time $t_{DROP}$, the SET distribution logic block 260, 500 receives a phase control signal indicating that a heavy load be served by N=4 active phases. This causes the switch node voltages of phases {1, 2, 3, 4} to track the clock divider's ring counter outputs {Q0, Q2, Q1, Q3}, respectively. The SET distribution logic block 260, 500 generates the firing sequence [Phase 1, Phase 3, Phase 2, Phase 4, Phase 1, Phase 3, Phase 2, Phase 4, etc.]. The phase angle relationship between the phases {1, 2, 3, 4} is 360°/N=90°. The phase shift between the waveforms 910-920 is 90°, which corresponds to the phase delay that is a fraction of the switching period as shown in Table 1.

TABLE 1

Phase Shift & Phase Delay Relationships with reference to Phase 0 for N = 4

| Active Phases (N) | Phase Number (0, 1, ..., N − 1) | Phase Delay from Phase 0 $\left(\frac{\text{Phase Number}}{\text{Number of Active Phases}} \times T_{SWITCHING}\right)$ | Phase Shift from Phase 0 waveform $\left(\text{Phase Number} \times \frac{360°}{N}\right)$ |
|---|---|---|---|
| 4 | 0 | $0 \times T_{SWITCHING}$ | 0° |
| 4 | 1 | $1/4 \times T_{SWITCHING}$ | 90° |
| 4 | 2 | $2/4 \times T_{SWITCHING}$ or $1/2 \times T_{SWITCHING}$ | 180° |
| 4 | 3 | $3/4 \times T_{SWITCHING}$ | 270° |

At the time $t_{DROP}$, the SET distribution logic block 260, 500 receives a phase control signal indicating that a lighter load be served by N=2 active phases. This causes the switch node voltages of phases {1, 2, 3, 4} to track the clock divider's ring counter outputs {Q0, Q1, Q2, Q3}, respectively. More particularly, the SET distribution logic block 260, 500 changes the mapping such that the phase 2 waveform 820 ceases to receive control signals from the phase 2 SET signal (SET<2> of FIG. 2) and begins to receive control signals from the phase 1 SET signal (SET<1> of FIG. 2). When N=2, the SET distribution logic block 260, 500 transmits a "0" value in the SET signals 505c-505d to the $T_{ON}$ monostables 274 in the phase blocks 272c-272d to output a "0" value from the corresponding switch nodes 204-205. The SET distribution logic block 260, 500 generates firing sequence [Phase 1, Phase 2, Phase 1, Phase 2, etc.]. The phase angle relationship between the phases {1, 2} is 360°/2=180°. The phase shift between the waveforms 910-920 is 180°, which corresponds to a switching period $T_{SWITCHING}/2$.

As shown by comparing Table 1 to Table 2, when the number of active phases reduces from N=4 to N=2, conversion characteristics change.

TABLE 2

Phase Shift & Phase Delay Relationships with reference to Phase 0 for N = 2

| Active Phases (N) | Phase Number (0, 1, ..., N − 1) | Phase Delay from Phase 0 $\left(\frac{\text{Phase Number}}{\text{Number of Active Phases}} \times T_{SWITCHING}\right)$ | Phase Shift from Phase 0 waveform $\left(\text{Phase Number} \times \frac{360°}{N}\right)$ |
|---|---|---|---|
| 2 | 0 | $0 \times T_{SWITCHING}$ | 0° |
| 2 | 1 | $1/2 \times T_{SWITCHING}$ | 180° |
| 2 | 2 | N/A | N/A |
| 2 | 3 | N/A | N/A |

The interleave block 220 changes conversion characteristics and completes transient response settling time within one switching period. In this particular example, as active phases are added or dropped based on system load demands, the phase angle from one active phase to the next is maintained within the range of 360°/N±7° at all times.

Figure 10:
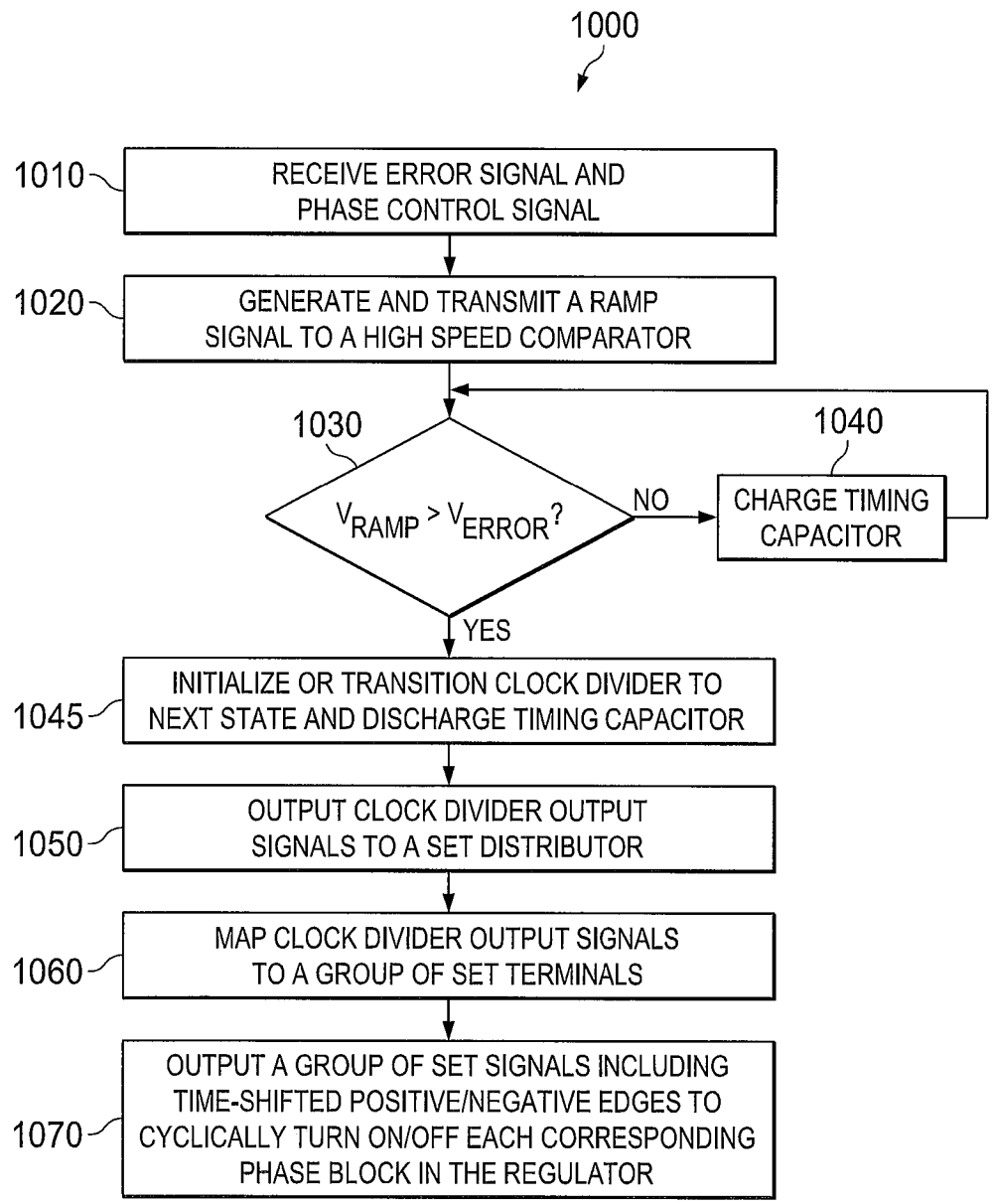
FIG. 10 is a flowchart of an example multiphase SMPS interleaving operation using clock division.

FIG. 10 is a flowchart 1000 of an example multiphase SMPS interleaving operation (performed by the multiphase SMPS 200) using clock division.

In block 1010, the interleave block 220 receives an error signal 213 and a phase control signal 221. The error signal 213 indicates a difference between the output voltage $V_{OUT}$ and a reference voltage $V_{REF}$. The reference voltage $V_{REF}$ represents the voltage level that the load 201 desires or requires. The phase control signal 221 indicates a number of active phases. In block 1020, the adjustable ISRC block 230 generates and transmits a ramp signal 235 to the high-speed comparator 240. The ramp signal 235 indicates the voltage across the timing capacitor 305.

If the ramp voltage $V_{RAMP}$ does not exceed the error voltage $V_{ERROR}$ in block 1030, the timing capacitor 305 charges while the comparator output signal 245 has a low value in block 1040. Here, the active discharge switch 320 is OFF, increasing the voltage across the timing capacitor 305. The current sources 355a-355d charge the timing capacitor 305 while the active discharge switch 320 is OFF. The operation returns to block 1030.

When $V_{RAMP}$ exceeds $V_{ERROR}$ in block 1030, the dynamic clock divider 250, 400 initializes the DFFs 405a-405d (upon startup) or transitions the DFFs 405a-405d to a next state by triggering the DFFs in block 1045. Also in block 1045, the timing capacitor 305 discharges while the comparator output signal 245 has a high value. Here, the active discharge switch 320 is ON, decreasing the voltage across the timing capacitor 305. In some embodiments, the timing capacitor 305 fully discharges within a predetermined time period set by the monostable 315.

In block 1050, the DFFs 405a-405d of the dynamic clock divider 250 output signals through their current output (Q) terminals. In some embodiments, the DFFs' current output terminals are coupled to provide output signals to the buck regulator 270, such as when the passive filter 280 does not include coupled inductors 282a-282d. In other embodiments, the DFFs' current output terminals are coupled to provide output signals to the SET distribution logic block 260, 500. In that case, in block 1060, the SET distribution logic block 260, 500 uses phase mappers 501-504 to map and distribute output signals (Q0, Q1, Q2, Q3) to SET output terminals 505a-505d. In block 1070, the interleave block 220 outputs signals to the buck regulator 270. In some embodiments, the interleave block 220 outputs signals through the SET output terminals 505a-505d.

Various quantitative values provided above (such as times, voltages, and currents) are approximations only. Implementations of the multiphase SMPS 200 can vary from these quantitative values as needed or desired. Moreover, due to manufacturing tolerances and other variations, identical implementations of the multiphase SMPS 200 can vary from these quantitative values.

Modifications are possible in the described embodiments, and other embodiments are possible, within the scope of the claims.

What is claimed is:

1. A method comprising:
  obtaining at a phase interleaver (i) a first signal indicating a variance between a reference voltage and a regulated output voltage and (ii) a second signal indicating a voltage across an energy storage device, wherein a voltage regulator includes multiple phase blocks collectively configured to generate the regulated output voltage; and
  in a repeating cycle:
    while the second signal is less than the first signal, increasing the voltage across the energy storage device; and
    in response to a determination that the second signal is greater than the first signal, substantially discharging the energy storage device, transitioning multiple stages of a clock divider in the phase interleaver, and outputting a set of control signals from the clock divider, the set of control signals having a common switching frequency and a common switching period;
  wherein the set of control signals controls the phase blocks in the voltage regulator that are active in generating the regulated output voltage.

2. The method of claim 1, wherein the second signal indicates a voltage across a timing capacitor having a charging rate based on a number of the phase blocks that are active in generating the regulated output voltage.

3. The method of claim 1, wherein substantially discharging the energy storage device includes fully discharging the energy storage device within a specified amount of time.

4. The method of claim 1, wherein a number of the phase blocks that are active in generating the regulated output voltage changes during different repetitions of the repeating cycle.

5. The method of claim 4, further comprising:
  in response to changing the number of the phase blocks that are active in generating the regulated output voltage, settling to a new phase angle between the active phase blocks within a fraction of one switching period.

6. The method of claim 1, wherein the switching frequency is at least 20 MHz.

7. The method of claim 1, wherein the clock divider includes a ring of D flip-flops, and wherein the set of control signals is based on outputs of the D flip-flops, and further comprising:
  initializing the output of one of the D flip-flops to a high logical value and initializing the outputs of the other D flip-flops to a low logical value.

8. The method of claim 7, further comprising:
  mapping the outputs of the D flip-flops to the set of control signals based on a number of the phase blocks that are active in generating the regulated output voltage.

9. An apparatus comprising:
  a comparator configured to compare (i) a first signal indicating a variance between a reference voltage and a regulated output voltage that is generated by a voltage regulator including multiple phase blocks and (ii) a second signal indicating a voltage across an energy storage device; and
  a phase interleaver configured in a repeating cycle to:
    while the second signal is less than the first signal, increase the voltage across the energy storage device; and
    in response to a determination that the second signal is greater than the first signal, substantially discharge the energy storage device, transition multiple stages of a clock divider in the phase interleaver, and output a set of control signals from the clock divider in order to control the phase blocks in the voltage regulator that are active in generating the regulated output voltage, the set of control signals having a common switching frequency and a common switching period.

10. The apparatus of claim 9, wherein the comparator is configured to receive the second signal that indicates a voltage across a timing capacitor having a charging rate based on a number of the phase blocks that are active in generating the regulated output voltage.

11. The apparatus of claim 9, wherein the phase interleaver includes a monostable configured to fully discharge the energy storage device within a specified amount of time.

12. The apparatus of claim 9, wherein the phase interleaver is configured to change a number of the phase blocks that are active in generating the regulated output voltage during different repetitions of the repeating cycle.

13. The apparatus of claim 9, wherein:
the clock divider includes a ring of D flip-flops;
the phase interleaver includes combinatorial logic configured to generate the set of control signals using outputs of the D flip-flops; and
the phase interleaver is configured to initialize the output of one of the D flip-flops to a high logical value and initialize the outputs of the other D flip-flops to a low logical value.

14. The apparatus of claim 13, wherein the combinatorial logic is configured to map the outputs of the D flip-flops to the set of control signals based on a number of the phase blocks that are active in generating the regulated output voltage.

15. A system comprising:
a voltage regulator including multiple phase blocks collectively configured to generate a regulated output voltage;
a comparator configured to compare (i) a first signal indicating a variance between a reference voltage and the regulated output voltage and (ii) a second signal indicating a voltage across an energy storage device; and
a phase interleaver configured in a repeating cycle to:
while the second signal is less than the first signal, increase the voltage across the energy storage device; and
in response to a determination that the second signal is greater than the first signal, substantially discharge the energy storage device, transition multiple stages of a clock divider in the phase interleaver, and output a set of control signals from the clock divider in order to control the phase blocks in the voltage regulator that are active in generating the regulated output voltage, the set of control signals having a common switching frequency and a common switching period.

16. The system of claim 15, wherein the voltage regulator includes a buck regulator.

17. The system of claim 15, further comprising:
a timing capacitor including the energy storage device, the timing capacitor having a charging rate based on a number of the phase blocks that are active in generating the regulated output voltage.

18. The system of claim 15, wherein the phase interleaver is configured to change a number of the phase blocks that are active in generating the regulated output voltage during different repetitions of the repeating cycle.

19. The system of claim 15, wherein:
the clock divider includes a ring of D flip-flops;
the phase interleaver includes combinatorial logic configured to generate the set of control signals using outputs of the D flip-flops;
the phase interleaver is configured to initialize the output of one of the D flip-flops to a high logical value and initialize the outputs of the other D flip-flops to a low logical value; and
the combinatorial logic is configured to map the outputs of the D flip-flops to the set of control signals based on a number of the phase blocks that are active in generating the regulated output voltage.

* * * * *